(12) United States Patent
Suzuki et al.

(10) Patent No.: US 7,339,699 B1
(45) Date of Patent: Mar. 4, 2008

(54) IMAGE PROCESSING APPARATUS

(75) Inventors: Hiroyuki Suzuki, Toyokawa (JP);
Kazuhiro Ishiguro, Toyohashi (JP);
Hideyuki Toriyama, Toyokawa (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 0 days.

(21) Appl. No.: 09/495,899

(22) Filed: Feb. 2, 2000

(30) Foreign Application Priority Data

| Feb. 3, 1999 | (JP) | ................................. 11-025733 |
| Feb. 17, 1999 | (JP) | ................................. 11-038057 |
| Mar. 19, 1999 | (JP) | ................................. 11-074836 |
| Mar. 30, 1999 | (JP) | ................................. 11-087549 |

(51) Int. Cl.
*G06F 15/00* (2006.01)
*H04N 1/46* (2006.01)
*G03F 3/08* (2006.01)

(52) U.S. Cl. ....................... 358/1.9; 358/505; 358/518

(58) Field of Classification Search .............. 358/1.15, 358/1.9, 509, 505, 512, 513, 514, 518, 515, 358/529; 382/162, 167; 348/300, 265
See application file for complete search history.

(56) References Cited

U.S. PATENT DOCUMENTS

| 4,841,337 A * | 6/1989 | Hiratsuka et al. ........... 347/119 |
| 4,866,512 A * | 9/1989 | Hirosawa et al. ........... 358/514 |
| 4,937,662 A * | 6/1990 | Matsunawa et al. ........ 358/538 |
| 4,937,664 A * | 6/1990 | Chiku et al. ................ 358/526 |
| 4,980,760 A * | 12/1990 | Hiratsuka et al. ........... 358/532 |
| 5,016,096 A * | 5/1991 | Matsunawa et al. ........ 358/538 |
| 5,109,274 A * | 4/1992 | Washio et al. .............. 358/518 |
| 5,227,871 A * | 7/1993 | Funada et al. .............. 358/500 |
| 5,270,807 A * | 12/1993 | Ikeda et al. ................. 358/500 |
| 5,270,851 A * | 12/1993 | Makino et al. ............. 359/206 |
| 5,315,413 A * | 5/1994 | Yamamoto et al. ......... 358/512 |
| 5,483,361 A * | 1/1996 | Shimizu et al. ............ 358/529 |
| 5,500,746 A * | 3/1996 | Aida ........................... 358/518 |
| 5,570,206 A * | 10/1996 | Yoshinaga .................. 358/497 |

(Continued)

FOREIGN PATENT DOCUMENTS

JP 01-097056 4/1989

(Continued)

OTHER PUBLICATIONS

Notification of Reasons for Refusal issued in a corresponding foreign application, and translation thereof.

*Primary Examiner*—Madeleine A V Nguyen
(74) *Attorney, Agent, or Firm*—Buchanan Ingersoll & Rooney PC

(57) ABSTRACT

An image processing apparatus includes a first sensor having a plurality of reading elements arranged in the primary scanning direction, a second sensor disposed in parallel with the first sensor and by a predetermined lines in the secondary scanning direction, an integral correction portion for correcting a time difference of data output due to a position difference between the first sensor and the second sensor by a line unit, and a fractional correction portion for correcting a time difference of data output due to a position difference between the first sensor and the second sensor by a sub line unit. Thus, the correction of the phase shift between element arrays can be performed as precisely as possible and the reproducibility of a black fine line is increased.

15 Claims, 30 Drawing Sheets

U.S. PATENT DOCUMENTS

| | | | |
|---|---|---|---|
| 5,602,972 A * | 2/1997 | Hada et al. | 358/1.13 |
| 5,696,594 A * | 12/1997 | Saito et al. | 358/296 |
| 5,768,671 A * | 6/1998 | Komiya et al. | 399/301 |
| 5,778,280 A * | 7/1998 | Komiya et al. | 399/49 |
| 5,859,712 A * | 1/1999 | Kim | 358/504 |
| 5,864,634 A * | 1/1999 | Kurita | 382/167 |
| 5,864,721 A * | 1/1999 | Suda et al. | 396/114 |
| 5,870,142 A * | 2/1999 | Noda et al. | 348/266 |
| 5,940,192 A * | 8/1999 | Ichikawa et al. | 358/530 |
| 5,949,555 A * | 9/1999 | Sakai et al. | 358/462 |
| 5,963,343 A * | 10/1999 | Kubo et al. | 358/473 |
| 6,061,162 A * | 5/2000 | Shiraishi et al. | 359/204 |
| 6,075,637 A * | 6/2000 | Inagaki | 359/205 |
| 6,163,414 A * | 12/2000 | Kikuchi et al. | 359/776 |
| 6,169,562 B1 * | 1/2001 | Morimoto | 347/232 |
| 6,335,805 B1 * | 1/2002 | Ishiguro et al. | 358/474 |
| 6,538,769 B2 * | 1/2002 | Yoshida et al. | 358/1.9 |
| 6,421,145 B1 * | 7/2002 | Kurita et al. | 358/448 |
| 6,449,060 B1 * | 9/2002 | Kawai et al. | 358/1.9 |
| 6,452,709 B1 * | 9/2002 | Shiraishi et al. | 359/205 |
| 6,473,194 B1 * | 10/2002 | Sakai | 358/1.17 |
| 6,486,974 B1 * | 11/2002 | Nakai et al. | 358/1.9 |
| 6,570,671 B1 * | 5/2003 | Yamaguchi et al. | 358/1.16 |
| 6,587,224 B1 * | 7/2003 | Nabeshima et al. | 358/1.9 |
| 6,621,602 B1 * | 9/2003 | Tsuji | 358/487 |
| 6,621,922 B2 * | 9/2003 | Takaragi et al. | 382/162 |
| 6,661,545 B2 * | 12/2003 | Sato et al. | 358/509 |
| 6,697,522 B1 * | 2/2004 | Ishikawa | 382/167 |
| 6,714,676 B2 * | 3/2004 | Yamagata et al. | 382/175 |
| 6,747,757 B1 * | 6/2004 | Enomoto | 358/1.9 |
| 6,747,766 B1 * | 6/2004 | Kamisuwa et al. | 358/505 |
| 6,801,334 B1 * | 10/2004 | Enomoto | 358/1.18 |
| 6,856,707 B2 * | 2/2005 | Enomoto | 382/277 |
| 6,870,564 B1 * | 3/2005 | Burns | 348/263 |
| 6,954,284 B2 * | 10/2005 | Enomoto | 358/1.18 |
| 7,079,685 B1 * | 7/2006 | Hirota et al. | 382/167 |
| 2002/0039444 A1 * | 4/2002 | Yamagata et al. | 382/199 |

FOREIGN PATENT DOCUMENTS

| | | |
|---|---|---|
| JP | 05-110881 | 4/1993 |
| JP | 07-288653 | 1/1995 |
| JP | 7-245712 | 9/1995 |
| JP | 09-261491 | 10/1997 |
| JP | 09-298665 | 11/1997 |
| JP | 11-069105 | 3/1999 |

* cited by examiner

― THRESHOLD AT EDGE PORTIONS ―
EDGE PORTION 1 REF1A > EDGE PORTION 1 REF1B
EDGE PORTION 2 REF3A > EDGE PORTION 2 REF3B

NON-EDGE PORTION 1 REF2A < NON-EDGE PORTION 1 REF2B
NON-EDGE PORTION 2 REF4A < NON-EDGE PORTION 2 REF4B

IMAGE PROCESSING APPARATUS

This application is based on Japanese Patent Application No. 25733/1999 filed on Feb. 3, 1999, No. 38057/1999 filed on Feb. 17, 1999, No. 74836/1999 filed on Mar. 19, 1999, and No. 87549/1999 filed on Mar. 30, 1999, the contents of which are incorporated herein by reference.

BACKGROUND OF THE INVENTION

1. Field of the Invention

The present invention relates to an image processing apparatus that is mounted in a digital color copying machine or other equipment. More specifically, the present invention relates to an interline correction process for correcting a misregistration among red, green and blue colors in the secondary scanning direction of a contraction type color CCD sensor. The present invention also relates to a chromatic aberration correction for correcting a phase shift in the primary scanning direction among image data of red, green and blue colors due to a chromatic aberration of a lens system.

2. Description of the Prior Art

An image reader portion of a color copying machine or other equipment usually has a contraction type color CCD sensor for reading information of an original image that is contracted and projected through an optical system, as described in Japanese unexamined patent publication No. 9-261491(A) for example. This is a common configuration since it is advantageous to the cost. The contraction type color CCD sensor has a structure shown in FIG. 10 in which three element arrays of red, green and blue colors are arranged in parallel with each other at a predetermined distance d in the secondary scanning direction. Each of the element arrays has plural elements of red, green or blue colors aligned in the primary scanning direction.

When using the above-mentioned color CCD sensor for reading an image, a time-base shift, i.e. a phase shift among image data of red, green and blue colors obtained by the CCD sensor is generated because of a position shift (by a distance d) between the element arrays of red, green and blue colors in the secondary scanning direction. The secondary scanning direction is a direction in which an original image and the CCD sensor move relatively to each other.

In order to correct the phase shift among red, green and blue colors (hereinafter, referred to as a misregistration), red image output data that are generated first are delayed by the time corresponding to the distance 2d (e.g., eight lines), and green image output data that are generated after the red image output data are delayed by the time corresponding to the distance d (e.g., four lines), so that the phases of the red and green image output data are adjusted to the phase of the blue image output data that are generated at last.

For example, in a color copying machine that has reducing and enlarging function, if the scaling ratio for contracting and projecting an original image is changed in such a way that a scanning speed is changed in the secondary scanning direction, the phase shift among red, green and blue colors cannot be an integral multiple of a line, but can have a remainder (a fraction). In this case, the phase shift among red, green and blue colors should be corrected as precisely as possible by an interpolation process. Namely, if the position after the correction is between the lines, the density of each color of the position is determined as a weighted average of the densities of the lines.

However, there is a case where a reproducibility of a black fine line is deteriorated by the above-mentioned correction of the fraction by the interpolation process in the correction of the phase shift among red, green and blue colors using a color CCD sensor. It is considered that the above-mentioned phenomenon is caused by an imbalance among reading characteristics of red, green and blue colors that can be generated by the above-mentioned interpolation process when the black fine line is contracted and projected in e.g., one dot width.

Therefore, the densities of colors except the reference color of the correction are decreased. As a result, the black fine line becomes greeny or reddish, so that the reproducibility of the black fine line is deteriorated.

It is generally known that the color deviation (a phase shift among colors) becomes larger in the periphery farther from the optical axis of the lens system due to a chromatic aberration generated by different refractive indexes of different wavelengths of light. This color deviation due to the chromatic aberration in the color copying machine can be suppressed within a small range less than one dot by improving the lens system or other means, but cannot be eliminated completely.

The color deviation due to the chromatic aberration affects particularly the reproducibility of black letters (including a black fine line) badly. A usual color copying machine determines black letter portions from image data and performs correction process such as edge emphasizing so that the reproducibility of the black letter portions can be improved. Various methods for determining black letter portions are proposed. Each method discriminates between an achromatic color and a chromatic color in accordance with image data of red, green and blue colors. For example, the difference between the maximum and minimum values of the image data of red, green and blue colors is calculated to be a chroma value. This chroma value is compared with a threshold value so as to discriminate between an achromatic color and a chromatic.

However, if the above-mentioned color deviation due to the chromatic aberration increases, the difference between the maximum and minimum values of the image data of red, green and blue colors, i.e., the chroma value becomes larger than the threshold value even in the case where a black letter is read, resulting in a failure to recognize the achromatic color. Consequently, the black letter cannot be recognized as a black letter portion, and a correction process such as edge emphasizing is not performed for the black letter, resulting in a deterioration of the reproducibility of the black letter.

In order to suppress the deterioration of the reproducibility of the black letter due to the chromatic aberration, the correction process proposed in the above-mentioned Japanese unexamined patent publication No. 9-261491(A) prepares plural kinds of filters for shifting the red image data and the blue image data in the opposite direction to each other with respect to the green image data by the same quantity (less than one dot in the primary scanning direction). The red image data obtained by red color light with long wavelength and the blue image data obtained by blue color light with short wavelength have phase shift directions opposite to each other with respect to the green image data obtained by the green light, and their phase shift directions are opposite to each other in both sides of the primary scanning direction.

Therefore, plural filters having different directions and quantities of phase shift are prepared for passing simultaneously the image data obtained by reading an original image. Then, the difference between the maximum and minimum values of the image data obtained from the filters, i.e., the chroma value is calculated. The minimum chroma value is adopted as the corrected chroma value, which is used for determining the black letter portion as explained above.

Since plural filters having appropriate shift quantities within a possible range are prepared, black letter portions cannot be determined incorrectly to have a chromatic color even if a phase shift due to the chromatic aberration is generated at the end of the primary scanning direction. Thus, the correction process such as edge emphasizing is performed properly, so that the reproducibility of the black letter portion can be improved.

Though the correction process of the chromatic aberration is performed uniformly over the entire area in the primary scanning direction, both edge portions in the primary scanning direction may be parts in which the chromatic aberration can affect the most. However, since the above-mentioned correction process of the chromatic aberration is also performed for the center portion where the influence of the chromatic aberration is little, a green color line is changed to have a low chroma, for example. As a result, the edge portion of the green line can be determined incorrectly to be the edge portion of the black line. This incorrect determination is required to be improved.

The filter used for the above-mentioned correction process shifts the red image data and the blue image data in the opposite direction to each other and by the same quantity. However, the quantity of the phase shift due to the chromatic aberration varies for each color in accordance with characteristics of the lens system or the resolution of an image sensor.

Furthermore, the above-mentioned correction process does not correct the image data of each color, but merely corrects the influence of the chromatic aberration on the determination of the chroma value for sensing black letters.

SUMMARY OF THE INVENTION

The object of the present invention is to correct the phase shift among the element arrays as precisely as possible and to improve the reproducibility of black fine lines.

Another object of the present invention is to correct the phase shift among image data of the color elements due to the chromatic aberration of the lens system and to enable switching the correction quantity in accordance with the characteristics of the lens system or the image sensor.

According to a preferred embodiment of the present invention, the image processing apparatus includes a first sensor having plural reading elements arranged in the primary scanning direction, a second sensor having plural reading elements arranged in the primary scanning direction and being disposed predetermined lines away from the first sensor in the secondary scanning direction, an integral correction portion for correcting output time difference between data due to difference of positions between the first sensor and the second sensor by one line unit, and a fractional correction portion for correcting output time difference between data due to difference of positions between the first sensor and the second sensor by sub line unit.

According to another preferred embodiment of the present invention, the image processing apparatus includes a sensor disposed linearly in the primary scanning direction for reading an original image after decomposing it into plural colors, an optical system for projecting light from the original image onto the sensor, and a correction portion for correcting a misregistration of colors in the primary scanning direction due to a chromatic aberration of the optical system for plural areas divided in the primary scanning direction.

Other objects and features of the present invention will be understood more clearly by the following descriptions of drawings and embodiments.

DESCRIPTION OF THE PREFERRED EMBODIMENTS

First Embodiment

Figure 1:
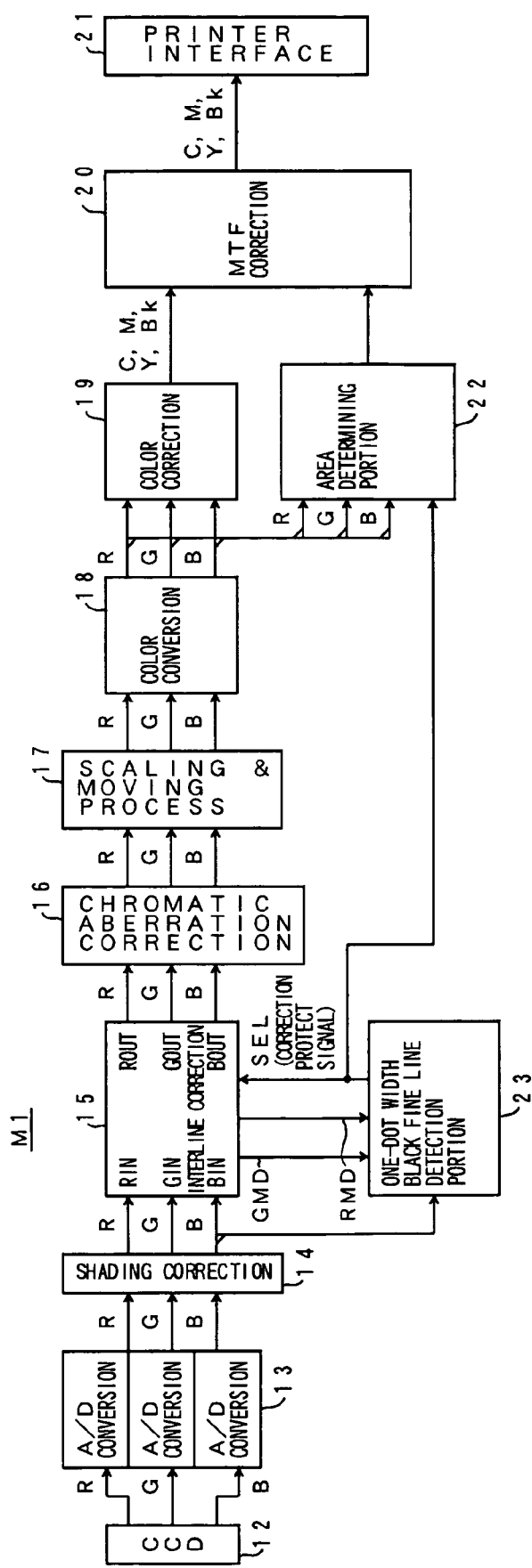
FIG. 1 is a block diagram showing an overall structure of an image processing apparatus of a first embodiment.

FIG. 1 is a block diagram showing an overall structure of an image processing apparatus M1 of a first embodiment.

In FIG. 1, information obtained by contracting and projecting an original image through an optical system is read by a contraction type color CCD sensor 12. The obtained image signals of red (R), green (G) and blue (B) colors are given to an A/D converter 13. The A/D converter 13 converts red, green and blue image signals that are analog signals into red, green and blue image data that are 8-bit digital data (256-step density data). The obtained red, green and blue image data are given to an interline correction portion 15 after shading correction by a shading correction portion 14 in which unevenness of light quantity in the primary scanning direction is corrected.

The interline correction portion 15 is a circuit that corrects a phase shift of the image signal (image data) due to a misregistration of red, green and blue lines of the CCD sensor 12. The interline correction portion 15 performs the correction by delaying the red and green image data using field memories. A concrete circuit of the interline correction portion 15 will be explained below. The red, green and blue image data that the interline correction portion 15 outputs are corrected by a chromatic aberration correction portion 16 concerning a color deviation due to the chromatic aberration of the lens system. After that, the data are processed in a scaling and moving process portion 17 including line memories for scaling so as to be enlarged or reduced in the primary scanning direction in accordance with a scaling ratio.

The red, green and blue image data that the scaling and moving process portion 17 outputs are given to a color conversion portion 18 for adjusting ratio of red, green and blue colors. Then a color correction portion 19 converts the RGB system (additive color system) image data into a CMY system (subtractive color system) image data C (cyan), M (magenta), Y (yellow) and Bk (black). The image data C, M, Y and Bk are processed by an MTF correction portion 20 for edge emphasizing, smoothing or other process, and then are given to a printer portion through a printer interface 21.

Furthermore, the red, green and blue image data that the color conversion portion 18 outputs are given to an area determining portion 22 too. The area determining portion 22 determines whether the read image is a dot image, a letter image, or a picture image. The determined result is given to the MTF correction portion 20, which performs or does not performs the correction process such as edge emphasizing or smoothing in accordance with the kind of the image at the present region.

In FIG. 1, a one-dot width black fine line detection portion 23 is a circuit for detecting whether the present reading image is substantially the one-dot width black fine line or not. The one-dot width black fine line detection portion 23 determines whether the present processing image portion of the image information that is projected to the CCD sensor 12 is the one-dot width black fine line or not in accordance with an output signal BIN of the shading correction portion 14 and red image delay data RMD and green image delay data GMD that the interline correction portion 15 outputs, as explained below. When determining one-dot width black fine line, the one-dot width black fine line detection portion 23 sets the output signal SEL to the low level, and otherwise sets the output signal SEL to the high level. This output signal SEL is imparted to the interline correction portion 15 and the area determining portion 22.

Figure 2:
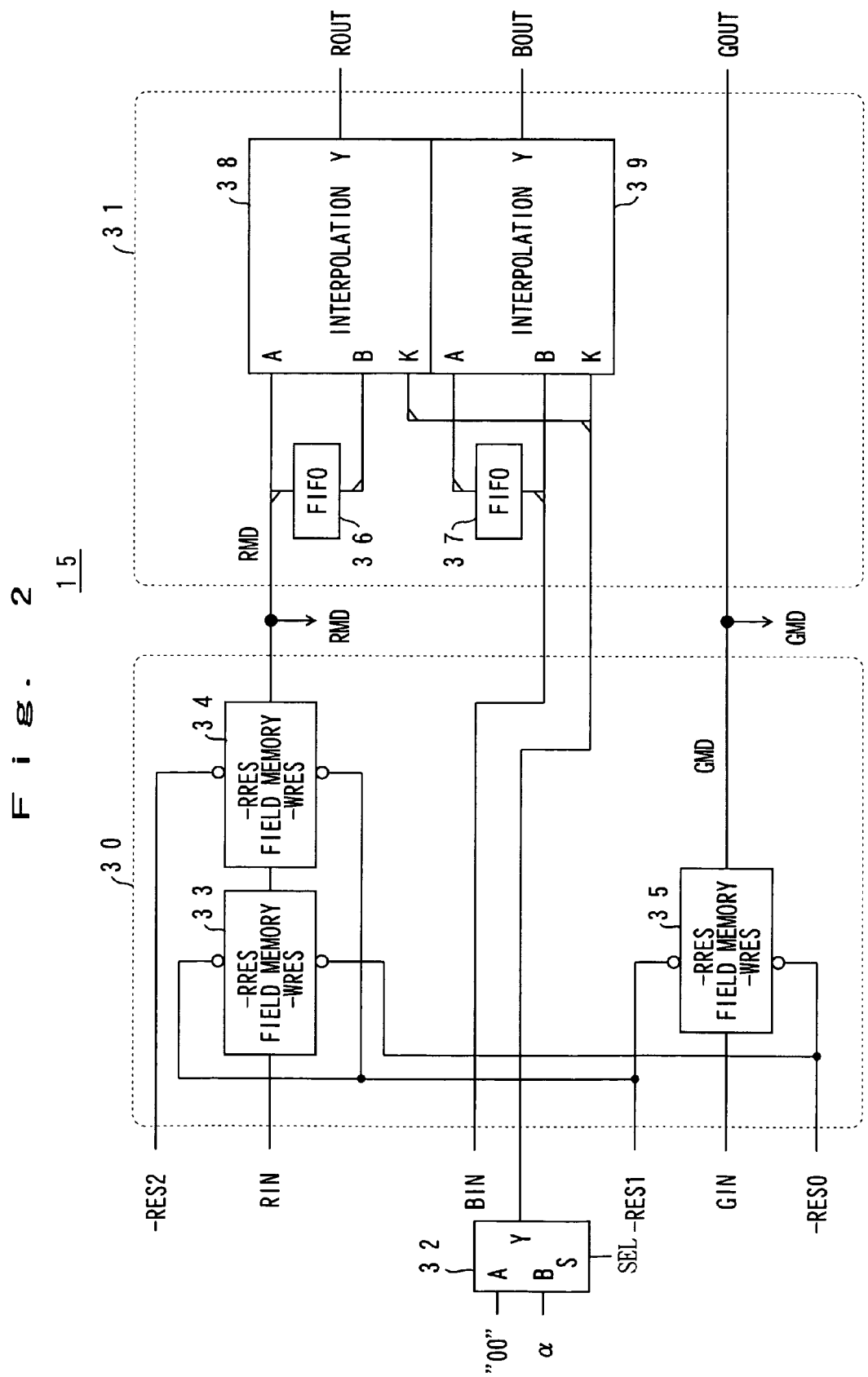
FIG. 2 is a block diagram showing an example of configuration of an interline correction circuit included in the image processing apparatus.

FIG. 2 is a block diagram of the interline correction portion 15.

In FIG. 2, signals RIN, BIN and GIN are image data inputs of red, blue and green, respectively. These image data inputs RIN, BIN and GIN are delayed by integral lines in a first correction portion 30. A second correction portion 31 performs an interpolation process for a remainder (a fraction) on these image data inputs to turn them into the image data output ROUT, BOUT and GOUT.

The first correction portion 30 uses field memories 33–35 for delaying the image data input RIN and GIN with respect to the image data input BIN. Namely, as explained as the prior art, the image data input RIN is delayed by the time corresponding to the distance (the gap) 2d between the red element array and the blue element array of the CCD sensor 12 in the secondary scanning direction, while the image data input GIN is delayed by the time corresponding to the distance (the gap) d between the green element array and the blue element array of the CCD sensor 12 in the secondary scanning direction. The gap d between element arrays is represented by the number of lines shifted between the element arrays. In this embodiment, the gap d between the green element array and the blue element array is four, while the gap 2d between the red element array and the blue element array is eight.

The field memories 33–35 are used for delaying the image data by plural-line unit. For example, supposing that each of the field memories 33–35 has a memory capacity of 256 Kbytes and the image data of each color has 5 Kbytes (5,000 pixels) for one line, one field memory can delay fifty-one lines of image data. As shown in FIG. 2, the image data input RIN can be delayed up to 102 lines by two field memories 33 and 34 connected in series, while the image data input GIN can be delayed up to 51 lines by one field memory 35.

Actual delay is determined by controlling a timing of a reset signal that is applied to a read set terminal RRES and a write set terminal WRES of each of the field memories 33–35. In FIG. 2, the prefixed mark "-" of each signal indicates that the signal is a negative logic signal, though the prefixed mark "-" is neglected in this description. The meaning of the prefixed mark "–" is the same in the other figures and description thereof.

Each of the field memories 33–35 starts writing the input data when the reset signal is given to the write reset terminal WRES, and starts outputting the stored data when the reset signal is given to the read reset terminal RRES. Therefore, the delay time is the period from the time when the reset signal is given to the write reset terminal WRES to the time when the reset signal is given to the read reset terminal RRES.

In FIG. 2, the reset signal RES0 is given to the write reset terminal WRES of the field memories 33 and 35, while the reset signal RES1 is given to the read reset terminal RRES of the field memories 33 and 35. In addition, the write reset terminal WRES of the field memory 34 is supplied with the reset signal RES1, and the read reset terminal RRES of the field memory 34 is supplied with the reset signal RES2. Therefore, the image data input RINR is delayed by the period from the reset signal RES0 to the reset signal RES2 in the two field memories 33 and 34 connected in series, while the image data input GINR is delayed by the period from the reset signal RES0 to the reset signal RES1 in the field memory 35. The image data input BINR is given to the second correction portion 31 without being delayed.

Figure 3:
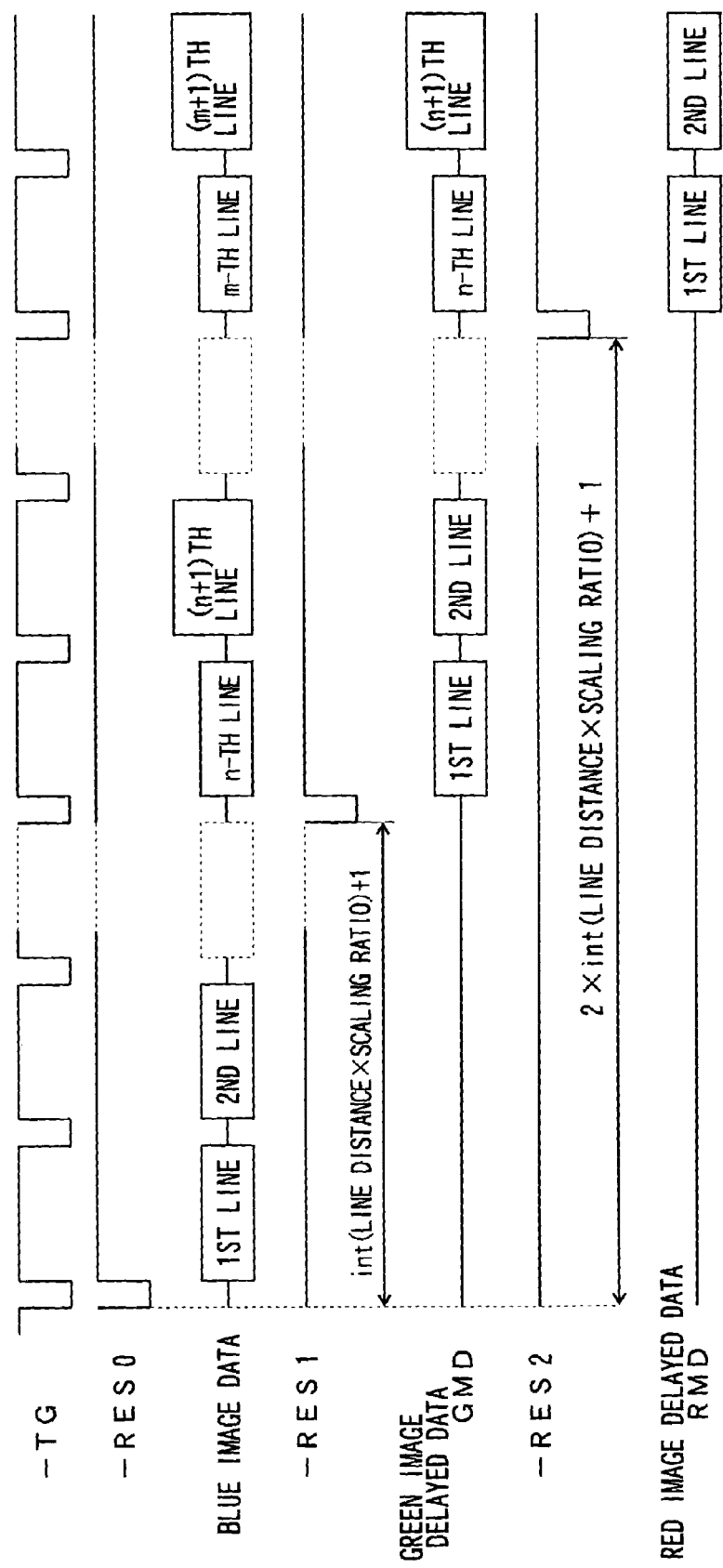
FIG. 3 is a timing chart showing integral correction by a first correction portion of the interline correction circuit.

FIG. 3 shows a timing chart of the reset signals RES0, RES1 and RES2, and the output image data of red, green and blue colors.

In FIG. 3, green image delay data GMD is obtained after delaying n lines from the blue image data, and red image delay data RMD is obtained after delaying further n-lines. The value of n, i.e., the number of lines corresponding to the delay time from the reset signal RES0 to the reset signal RES1 is an integral portion (int) of the value obtained by multiplying the distance between element arrays by the scaling ratio. If the scaling ratio is one, the value of n is the distance between element arrays, e.g., four lines. If the scaling ratio is 0.6, the value of n is two, i.e., the integral portion of 2.4 that is 4 multiplied by 0.6. Actually, one is added to this value so as to make a final delay (number of lines). Thus, the second correction portion 31 can perform the interpolation process easily as explained below. In the same way, concerning the number of lines corresponding to the delay time from the reset signal RES0 to the reset signal RES2, the final delay (number of lines) is obtained by multiplying the distance between element arrays by the scaling ratio and adding one to the twice the integral portion (int) of the result of the above multiplying.

The obtained red delayed image data and green delayed image data are given to the second correction portion 31 along with the blue image data that is not delayed. The second correction portion 31 passes the green delayed image data without the correction process so as to output it as the image data output GOUT, and applies the interpolation process to the red delayed image data and the blue image data with respect to the green delayed image data. The green delayed image data is not processed by the correction process so as to avoid reducing density of green image because the green image is more conspicuous than the red image and the blue image.

The second correction portion 31 includes FIFO memories 36 and 37 for delaying the red delayed image data and the blue image data by one line and interpolation operating portions 38 and 39. The red delayed image data $R_n$ is given to the A input terminal of the interpolation operating portion 38, and the B input terminal of the interpolation operating portion 38 is supplied with the red delayed image data $R_{n-1}$ that is delayed additional one line by the FIFO memory 36.

The K terminal of the interpolation operating portion 38 is supplied with the interpolation coefficient $\alpha$. The interpolation operating portion 38 calculates interpolation data $R_n'$ of the data $R_n$ and the data $R_{n-1}$, using the interpolation coefficient $\alpha$ in accordance with an equation explained below.

The blue image data $B_{n-1}$ that is delayed one line by the FIFO memory 37 is given to the A input terminal of the interpolation operating portion 39, and the blue image data $B_n$ before delay is given to the B input terminal of the interpolation operating portion 39. The K terminal of the interpolation operating portion 39 is supplied with the interpolation coefficient $\alpha$. The interpolation operating portion 39 calculates the interpolation data $B_n'$ of the data $B_n$ and the data $B_{n-1}$ using the interpolation coefficient $\alpha$ in accordance with the equation explained below.

The interpolation coefficient $\alpha$ is a remainder (a fraction) of the distance between element arrays multiplied by the scaling ratio. In the above example, the interpolation coefficient $\alpha$ is 0.4 that is a fraction of 2.4 obtained by multiplying 4 that is the distance between element arrays by 0.6 that is the scaling ratio. Therefore, the interpolation coefficient $\alpha$ is derived by the following equation (1).

$$\alpha = \text{distance} \times \text{scaling ratio} - \text{int}(\text{distance} \times \text{scaling ratio}) \quad (1)$$

Here, int( ) is an operator for extracting the integral portion of the value in parentheses.

Using this interpolation coefficient $\alpha$, the red and blue image data after the correction, i.e., the interpolation data $R_n'$ and $B_n'$ are derived from the following equations.

$$R_n' = R_n(1-\alpha) + R_{n-1} \times \alpha \quad (2)$$

$$B_n' = B_{n-1}(1-\alpha) + B_n \times \alpha \quad (3)$$

In the equations (2) and (3), the coefficients $\alpha$ and $(1-\alpha)$ for the (n−1)th line data and the n th line data are opposite to each other for the red image data and the blue image data. In connection with this, as shown in FIG. 2, the relationship between the image data given to the A terminal and the B terminal of the interpolation operating portions 38 and 39 and the one-line delayed data thereof is opposite to each other. This is because the green element array is disposed between the red element array and the blue element array in the CCD sensor 12 as mentioned above.

Figure 4:
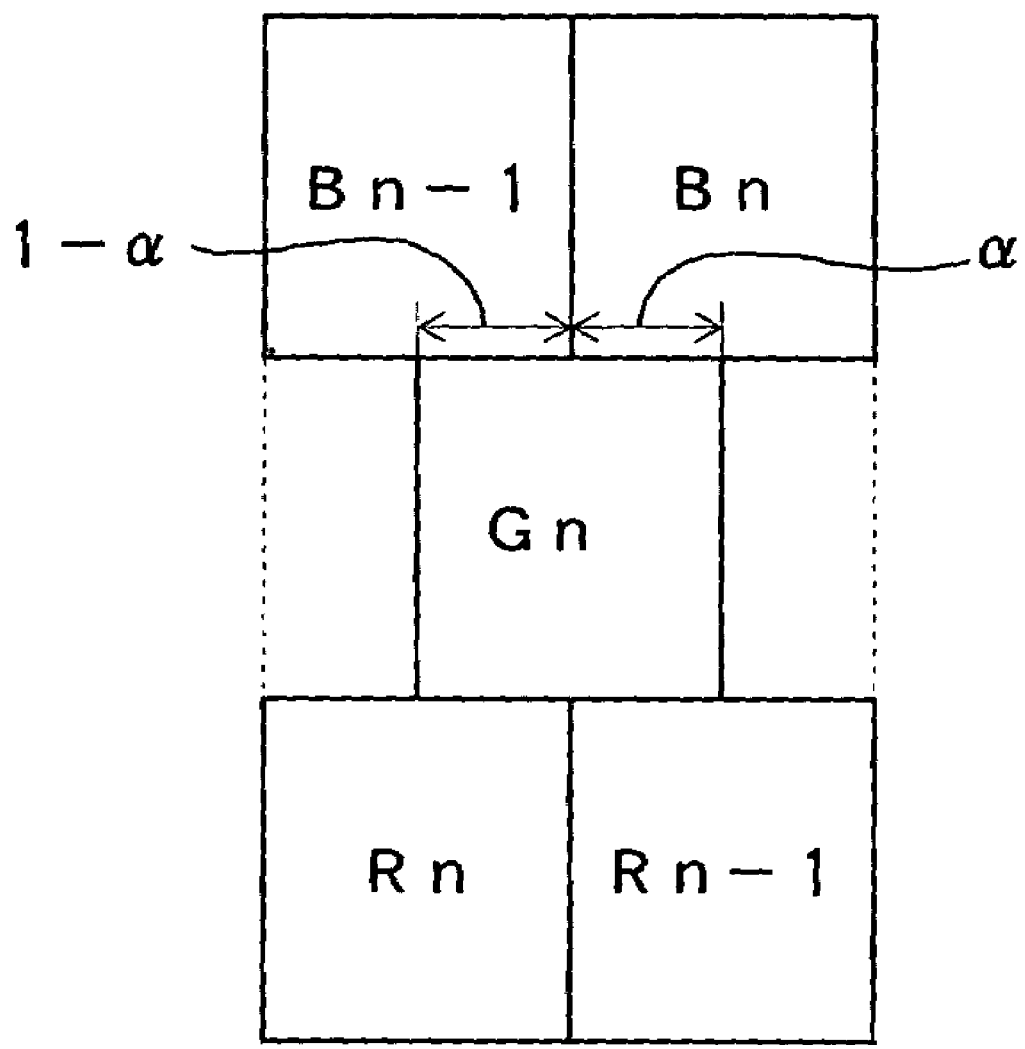
FIG. 4 is a schematic drawing for explaining an interpolation process of a fraction portion by a second correction portion of the interline correction circuit.

FIG. 4 schematically shows the relationship of the equations (2) and (3).

In FIG. 4, supposing that the positions of $R_n$, $R_{n-1}$, $B_n$, and $B_{n-1}$ are fixed, the position of $G_n$ varies from $B_{n-1}$ (or $R_n$) side to $B_n$ (or $R_{n-1}$) side when the value of the interpolation coefficient $\alpha$ varies from 0 to 1. Though the first correction portion 30 delays the red image data further one line compared with the blue image data as mentioned above, the interpolation process by the second correction portion 31 compensates the one line, so that the phases of the red, green and blue image data are aligned.

As explained above, the first correction portion 30 performs integral line correction of the misregistration, and the second correction portion 31 performs the interpolation process for the fraction portion, so that more detailed correction of color deviation can be performed.

However, since the interpolation process of the fraction portion involves a calculation of the weighted average of the densities of the lines, the density of e.g., one-dot width fine line is substantially decreased by the interpolation process. As a result, the density balance among the red, green and blue colors of the black fine line is lost substantially, and the reproducibility of the black fine line is deteriorated.

Figure 5:
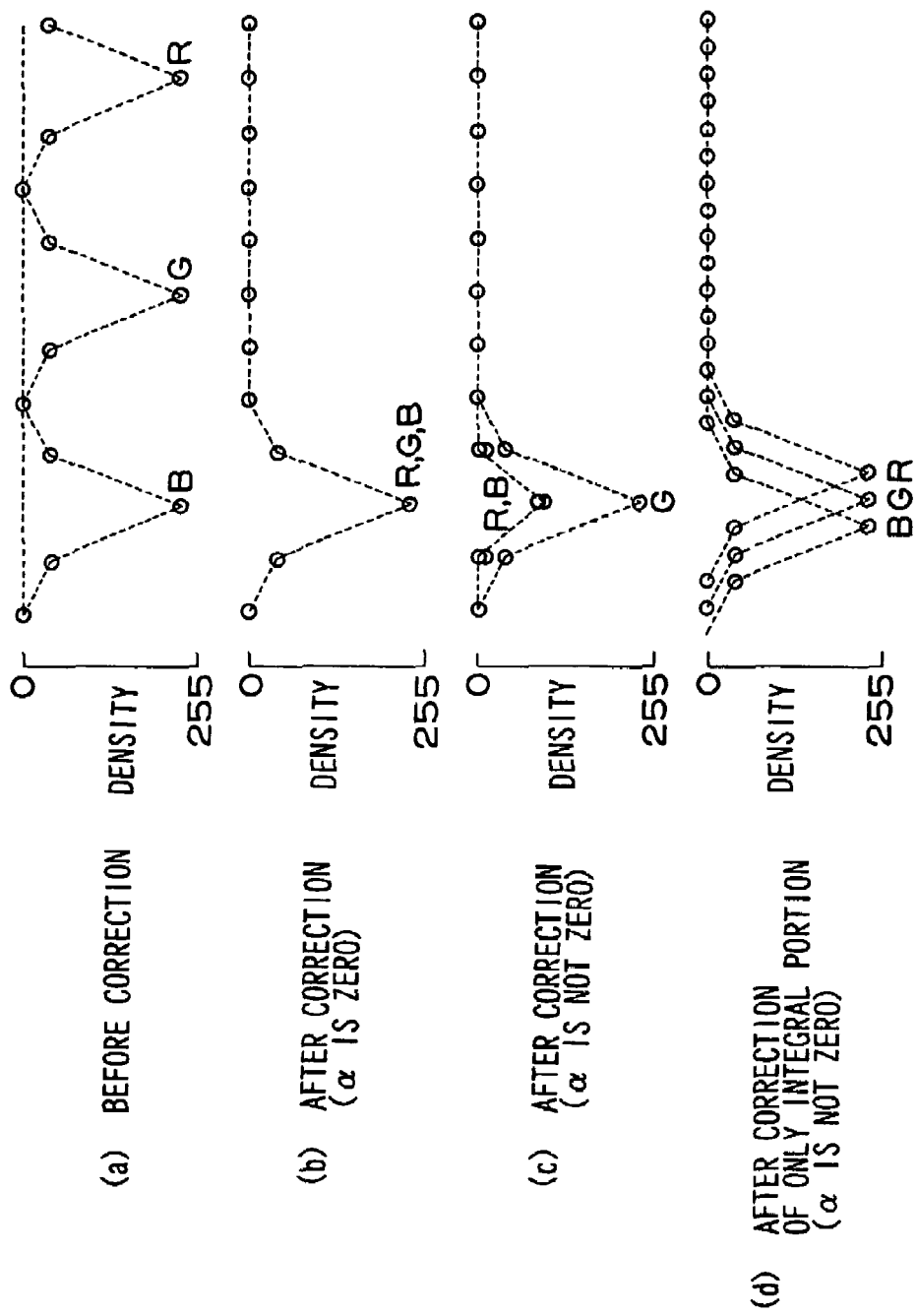
FIG. 5 is a graph showing phases and densities of red, green and blue image data for a black fine line in one dot width.

Further explanation with reference to FIG. 5 will be helpful. FIG. 5 shows positions (phases) and densities of the red, green and blue image data of the one-dot width black fine line. In FIG. 5, (a) shows the state before correction by the interline correction portion 15, and (b) shows the positions (phases) and densities of the red, green and blue image data after the correction when the scaling ratio is one, i.e., the interpolation coefficient α is zero. In this case, the second correction portion 31 does not perform the interpolation process of the fraction portion. Therefore, the density of each image data is not decreased, and only the integral line ection of the misregistration is performed by the first correction portion 30.

In FIG. 5, (c) shows the positions (phases) and densities of the red, green and blue image data after the correction by the first correction portion 30 and the second correction portion 31 of the interline correction portion 15 when the scaling ratio is not one and the interpolation coefficient α is not zero. In this case, the density of the green image data that is a reference (i.e., the interpolation process is not adapted) does not vary, while the densities of the red and blue image data drop substantially due to the interpolation process. Consequently, as mentioned above, the densities of colors become out of balance substantially and the reproducibility of black fine lines becomes deteriorated.

In order to improve the problem, as shown in FIG. 2, a selector 32 is provided for automatically selecting whether the interpolation process of the fraction portion by the second correction portion 31 is performed or not in accordance with an output signal SEL of the one-dot width black fine line detection portion 23 (hereinafter, referred to as a interpolation protection signal) as shown in FIG. 1. In FIG. 5, if only the integral line correction by the first correction portion 30 is performed without the interpolation process of the fraction portion by the second correction portion 31, the positions (phases) and densities of the red, green and blue image data shown in (c) becomes as shown in (d). In this case, a little misregistration among red, green and blue colors remains, but the drops of densities due to the interpolation process does not occur. Therefore, the density balance among colors is not lost, and the reproducibility of black fine lines is improved better than that of FIG. 5(c).

In FIG. 2, the selector 32 selects the interpolation coefficient α given to the B terminal when the interpolation protection signal SEL given to the S terminal is the high level (the inactive level), and imparts the interpolation coefficient α to the K terminals of the interpolation operating portions 38 and 39. However, when the one-dot width black fine line detection portion 23 detects the one-dot width black fine line and the interpolation protection signal SEL becomes the low level (the active level), the selector 32 selects "00" given to the A terminal so as to impart the "00" to the K terminals of the interpolation operating portions 38 and 39. Namely, the value of interpolation coefficient α in the equations (2) and (3) and FIG. 4 is set to zero.

Thus, since the interpolation process of the fraction portion is not applied to one-dot width black fine lines, higher priority is given to avoidance of the density drop than to the detail correction of the misregistration (the color deviation) so that the reproducibility of black fine lines can be improved.

The one-dot width black fine line detection portion 23 calculates the absolute value of the difference between the present image data and the neighboring image data on time-basis for each of the red, green and blue image data. If all of the six result values are greater than a predetermined threshold value, it is decided to be one-dot width black fine line, and the interpolation protection signal SEL is set to the low level (the active level). If at least one of the six result values is less than the threshold level, the interpolation protection signal SEL is set to the high level (the inactive level). Namely, the interpolation protection signal SEL is set to the low level only when the following conditions are satisfied.

$|R_n-R_{n-1}|>S1$ AND $|R_n-R_{n+1}|>S2$ AND $|G_n-G_{n-1}|>S3$ AND $|G_n-G_{n+1}|>S4$ AND $|B_n-B_{n-1}|>S5$ AND $|B_n-B_{n+1}|>S6$ (4)

The threshold levels S1–S6 can be the same or different from each other in accordance with the characteristics of each color.

Figure 6:
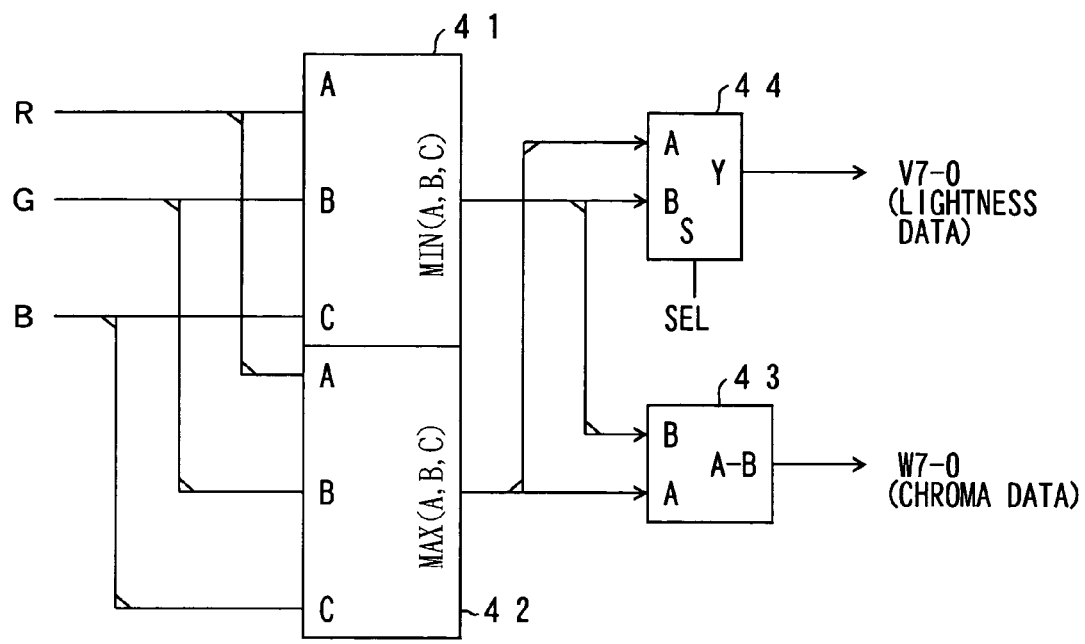
FIG. 6 is a block diagram showing an example of configuration of an area determining portion included in the image processing apparatus.
Figure 7:
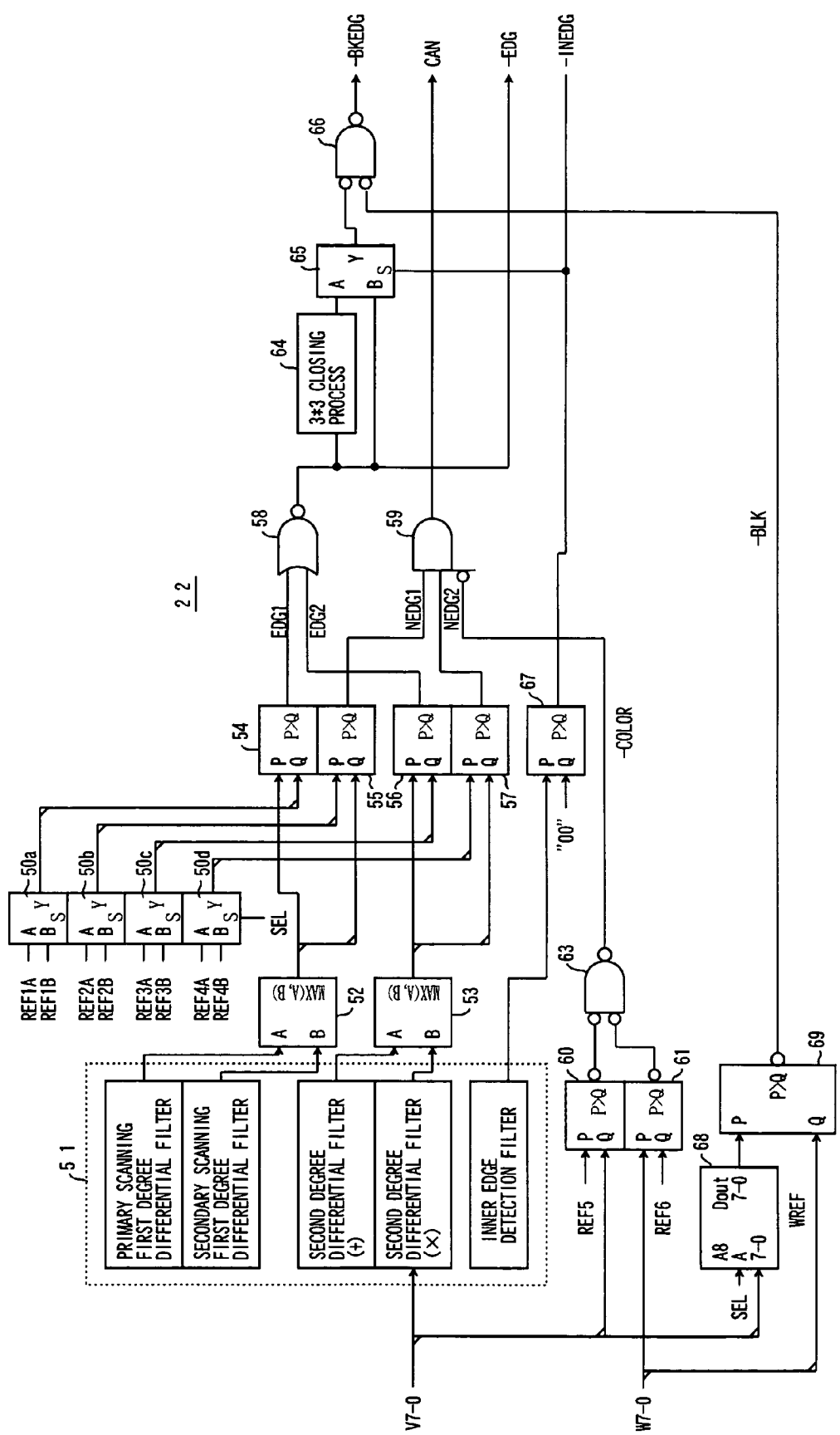
FIG. 7 is a block diagram showing an example of configuration of an area determining portion included in the image processing apparatus.
Figure 8:
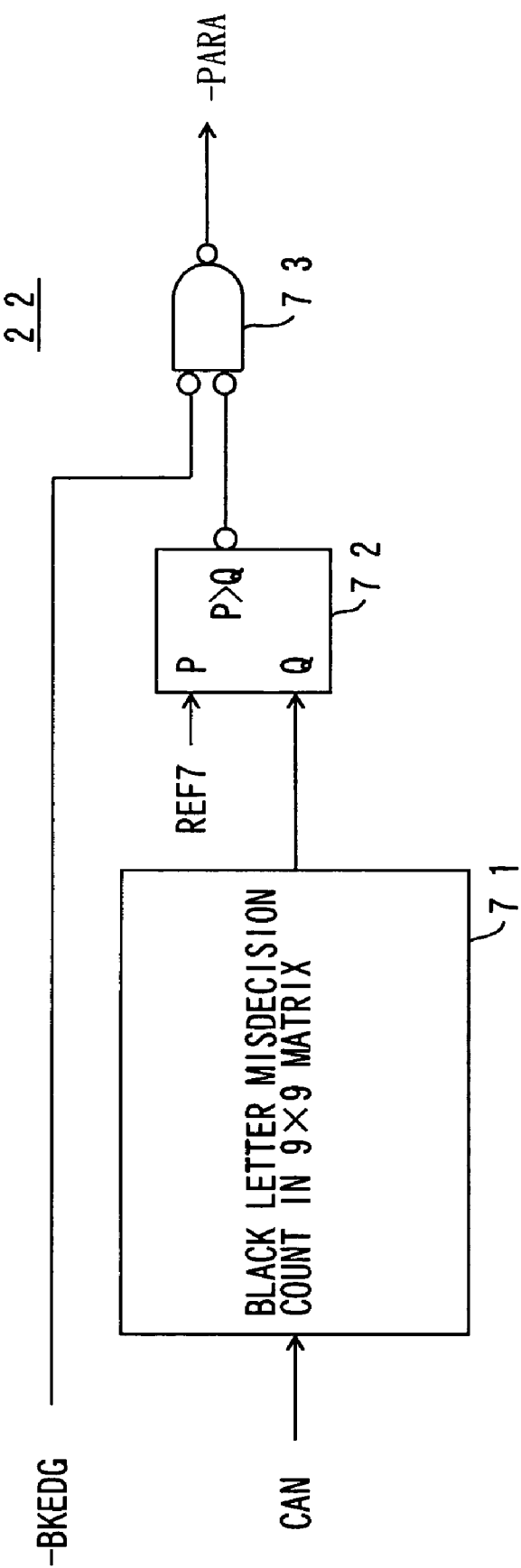
FIG. 8 is a block diagram showing an example of configuration of an area determining portion included in the image processing apparatus.

FIGS. 6–8 shows a specific circuit of the area determining portion 22 shown in FIG. 1. In FIG. 6, the minimum values of the red, green and blue image data are calculated by a minimum value circuit 41 and are output. In the same way, the maximum values of the red, green and blue image data are calculated by a maximum value circuit 42 and are output. In addition, a chroma calculation portion 43 calculates the difference between the maximum value and the minimum value of the red, green and blue image data, and outputs it as chroma data W7-0. The larger the difference between the maximum value and the minimum value of the red, green and blue image data, the larger the value of chroma data becomes.

The maximum value and the minimum value of the red, green and blue image data are input to the A terminal or the B terminal of a selector 44. The output signal of the one-dot width black fine line detection portion 23 (hereinafter, referred to as a black fine line detection signal) SEL is given to the selection control terminal S. The selector 44 selects the minimum value of the red, green and blue image data (the B terminal input) and outputs it as lightness data V7-0 when the black fine line detection signal SEL is the high level. If the black fine line detection signal SEL is the low level, the selector 44 selects the maximum value of the red, green and blue image data (the A terminal input) and outputs it as lightness data V7-0. Thus, the edge of the one-dot width black fine line can be detected easily by the area determining portion 22 and the contrast is improved.

The lightness data V7-0 are given to a characteristic quantity extracting filter 51 as shown in FIG. 7. The characteristic quantity extracting filter 51 calculates the first degree differential and the second degree differential in each of the primary scanning direction and secondary scanning direction of the lightness data V7-0. A greater one of the first degree differentials in the primary scanning direction and the secondary scanning direction is selected by a maximum circuit 52, and is imparted to comparators 54 and 55.

The comparator 54 outputs the high level of the edge portion 1 decision output EDG1 when the first degree differential given to the P terminal is greater than the threshold given to the Q terminal for determining the edge portion 1, and outputs the low level when the first degree differential is less than the threshold. As the threshold for determining the edge portion 1, two threshold values REF1A and REF1B are prepared, either of which is selected by the selector 50a. If the black fine line detection signal SEL is the high level (the inactive level), the threshold REF1B is selected. If the black fine line detection signal SEL is the low level (the active level), the threshold REF1A is selected. The threshold REF1A is greater (stricter) than the threshold REF1B.

The comparator 55 outputs the high level of the non-edge portion 1 decision output NEDG1 when the first degree differential given to the Q terminal is less than the threshold given to the P terminal for determining the non-edge portion 1, and outputs the low level when the first degree differential is greater than the threshold. As the threshold for determining the non-edge portion 1, two threshold values REF2A and REF2B are prepared, either of which is selected by the selector 50b. If the black fine line detection signal SEL is the high level (the inactive level), the threshold REF2B is selected. If the black fine line detection signal SEL is the low level (the active level), the threshold REF2A is selected. The threshold REF2A is less (stricter) than the threshold REF2B.

In the same way, a greater one of the second degree differentials in the primary scanning direction and the secondary scanning direction is selected by the maximum circuit 53, and is imparted to comparators 56 and 57.

The comparator 56 outputs the high level of the edge portion decision 2 output EDG2 when the second degree differential given to the P terminal is greater than the threshold given to the Q terminal for determining the edge portion 2, and outputs the low level when the second degree differential is less than the threshold. As the threshold for determining the edge portion 2, two threshold values REF3A and REF3B are prepared, either of which is selected by the selector 50c. If the black fine line detection signal SEL is the high level (the inactive level), the threshold REF3B is selected. If the black fine line detection signal SEL is the low level (the active level), the threshold REF3A is selected. The threshold REF3A is greater (stricter) than the threshold REF3B.

The comparator 57 outputs the high level of the non-edge portion 2 decision output NEDG2 when the second degree differential given to the Q terminal is less than the threshold given to the P terminal for determining the non-edge portion 2, and outputs the low level when the second degree differential is greater than the threshold. As the threshold for determining the non-edge portion 2, two threshold values REF4A and REF4B are prepared, either of which is selected by the selector 50d. If the black fine line detection signal SEL is the high level (the inactive level), the threshold REF4B is selected. If the black fine line detection signal SEL is the low level (the active level), the threshold REF4A is selected. The threshold REF4A is less (stricter) than the threshold REF4B.

As explained above, concerning the decision of the edge portion, if the black fine line detection signal SEL is the low level, i.e., the one-dot width black fine line is detected, the threshold is set stricter than other case. The decision output of the non-edge portion is used for preventing misdecision of black letters as explained below.

In the decision of the non-edge portion too, when the one-dot width black fine line is detected, the threshold is set stricter than other case.

The edge portion 1 decision output EDG1 and the edge portion 2 decision output EDG2 are input to a NOR circuit 58. If one of the inputs is the high level, the output becomes the low level. The output signal is imparted to other circuit as the edge portion signal EDG indicating the edge portion by its low level. The signal BKEDGE indicating the black edge portion is also generated by the process explained below.

The non-edge portion 1 decision output NEDG1 and the non-edge portion 2 decision output NEDG2 are given to an AND gate 59 along with the signal COLOR indicating a color region. If both the output NEDG1 and the output NEDG2 are the high level and the color region is detected, the black letter misdecision signal CAN that is an output of the AND gate 59 becomes the high level. This signal CAN is used for protecting misdecision of a black letter as explained below.

The signal COLOR indicating a color region is obtained by AND operation by the AND circuit 63 based on the comparing result of the lightness data V7-0 with the threshold REF5 and the comparing result of the chroma data W7-0 with the threshold REF6. The comparator 60 makes the output active if the lightness data V7-0 is less than the threshold REF5. The comparator 61 makes the output active if the chroma data W7-0 is greater than the threshold REF6.

The edge portion signal EDG, i.e., the output of the NOR circuit 58 is given to a closing process circuit 64 for the process of enlarging the edge portion by 3×3 matrix operation. The output of the closing process circuit 64 is given to the A terminal of a selector 65. The other input, i.e., the B terminal of the selector 65 is supplied with the output of the NOR circuit 58 that is the edge portion signal EDG before the enlarging process. The selector 65 selects the edge portion signal given to the A terminal after the enlarging process when the inner edge signal INEDG given to the selection control terminal S is the low level, and selects the edge portion signal given to the B terminal before the enlarging process when the inner edge signal INEDG is the high level.

Therefore, the edge portion signal that the Y terminal of the selector 65 outputs is enlarged when the inner edge signal INEDG is the low level, while it is not enlarged when the inner edge signal INEDG is the high level. The inner edge signal INEDG is a signal obtained by comparing the output signal of the inner edge detection filter included in the characteristic quantity extracting filter 51 with "00" by the comparator 67, and indicates the inner portion of the edge region, i.e., the portion on the black line when at the low level. Accordingly, the outer portion of the edge region, i.e., the background of the black line has the high level of the inner edge signal INEDG. This inner edge signal INEDG is also used for other circuits.

The output of the selector 65 becomes one of the inputs of the negative logic AND gate 66, and the other input is supplied with a negative logic black region signal BLK that indicates a black region. The negative logic AND gate 66 operates AND (negative logic AND) of two signals and outputs the results as the black edge signal BKEDG of the negative logic. The black region signal BLK is a signal obtained by comparing the data converted from the lightness data V7-0 by the threshold table (WREF) 68 for black decision with the chroma signal W7-0. Namely, the comparator 69 outputs the low level of the output BLK if the output data of the threshold table (WREF) 68 for black decision given to the terminal P is greater than the chroma signal W7-0 given to the terminal Q.

Figure 9:
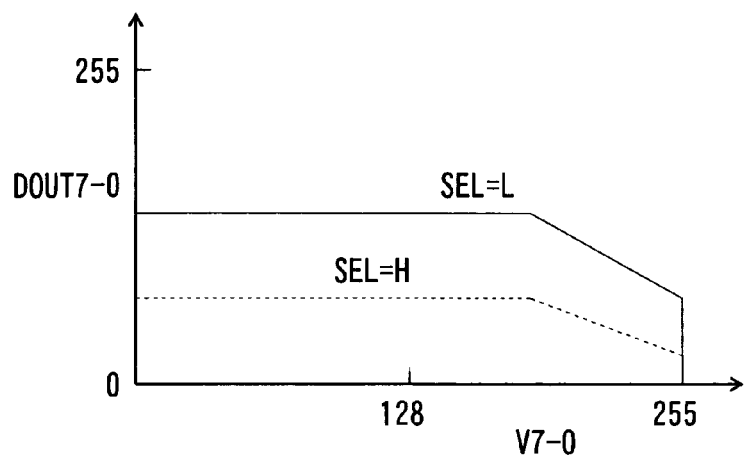
FIG. 9 is a graph showing conversion characteristics of a threshold table for determining black color included in the area determining portion.
Figure 10:
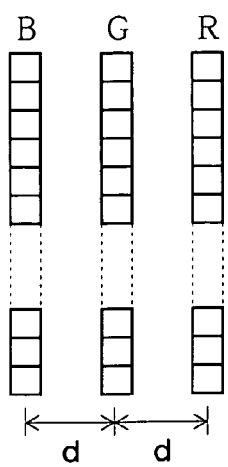
FIG. 10 is a schematic drawing showing a structure of a contraction type color CCD sensor.

The threshold table 68 for black decision has two conversion characteristics as shown in FIG. 9 by the full line and the broken line, and one of the two conversion characteristics is selected in accordance with the black fine line detection signal SEL given to the switch terminal A8. In the normal state where the black fine line detection signal SEL is the high level (inactive), the conversion characteristics of the broken line is selected. When the black fine line detection signal SEL is the low level (active), i.e., if the one-dot width black fine line is detected, the conversion characteristics of the full line are selected. Namely, if the one-dot width black fine line is detected, the reference data given to the P terminal of the comparator 69 becomes higher (lenient), and has a tendency to be determined as a black region.

The black letter misdecision signal CAN that the AND gate 59 outputs is given to the black letter misdecision count portion 71 as shown in FIG. 8, which counts the number of black letter misdecision in the 9×9 matrix. The result is given to the comparator 72 and is compared with the threshold REF7. If the number of black letter misdecision is smaller than the threshold REF7, the output of the comparator 72 becomes the low level, and otherwise it becomes the high level. This output is given to a negative logic AND gate 73, which operates AND of the output and the black edge signal BKEDG (the output of the negative logic AND gate 66 shown in FIG. 7).

The output of the negative logic AND gate 73 finally becomes the negative logic signal PAPA indicating the black letter edge portion. Namely, when the black edge signal BKEDG is the low level (active) and the number of the black letter misdecision counted by the black letter misdecision count portion 71 is smaller than the threshold REF7, the black letter edge portion signal PAPA becomes the low level.

These region decision signals are given to the MTF correction circuit 20 as the output of the area determining portion 22 shown in FIG. 1, and the MTF correction circuit 20 performs the correction process such as edge emphasizing or smoothing in accordance with the region decision signal.

In the embodiment explained above, though the distance d between the element arrays is four and the distance 2d is eight, other integral or non-integral value can be used.

As explained above, according to the present embodiment, the correction of the phase shift among red, green and blue colors of the contraction type color CCD sensor can be performed as precisely as possible, while the reproducibility of the black fine line can be improved by preventing the interpolation process.

Second Embodiment

Figure 11:
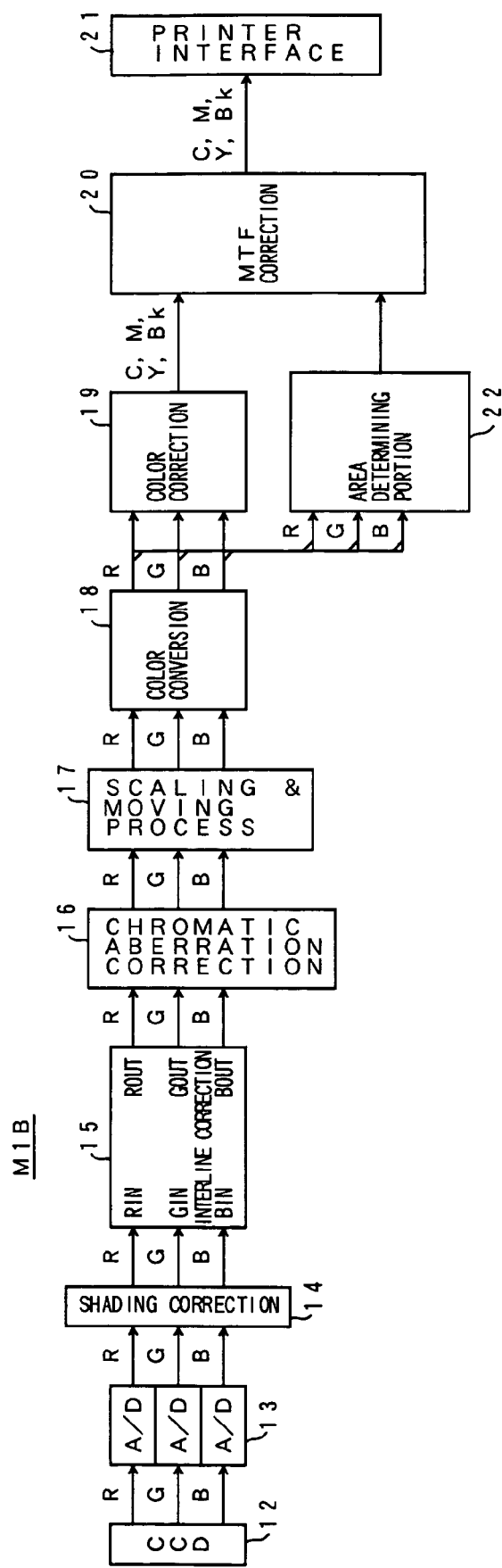
FIG. 11 is a block diagram showing an overall structure of an image processing apparatus of a second embodiment.
Figure 12:
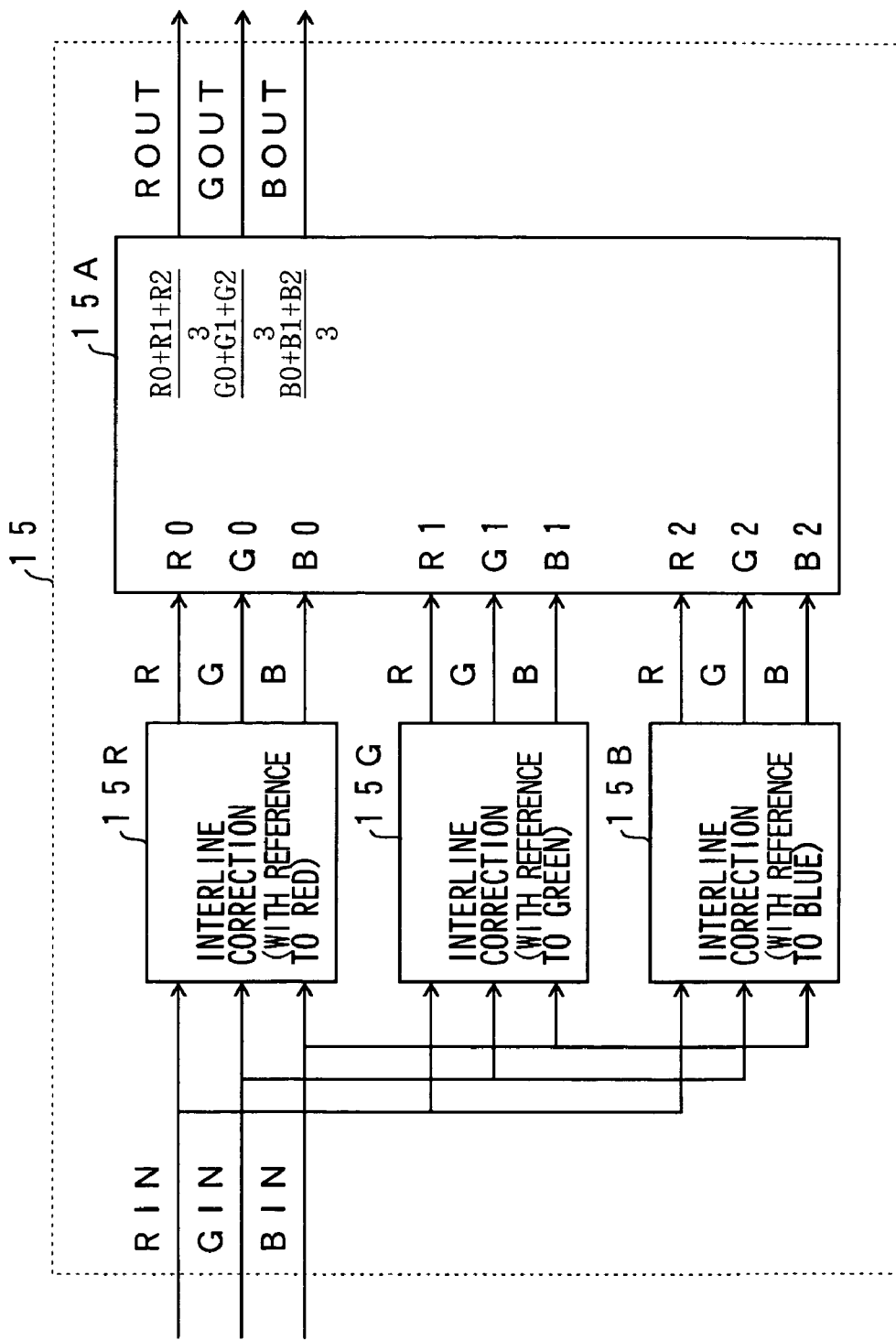
FIG. 12 is a block diagram showing configuration of an interline correction circuit.

FIG. 11 is a block diagram showing an overall structure of an image processing apparatus M1B of a second embodiment. FIG. 12 is a block diagram showing configuration of an interline correction circuit 15. In each figure of the second embodiment, the element having the same function as in the image processing apparatus M1 of the first embodiment is denoted by the same reference numeral.

In FIG. 11, the operation and the process of each portion of the image processing apparatus M1B is similar to that explained for the first embodiment with reference to FIG. 1, so the explanation is omitted.

As shown in FIG. 12, the interline correction portion 15 include three interline correction circuits 15R, 15G and 15B using reference color of red, green and blue respectively, and a correction output portion 15A that outputs image data after corrected by calculating the average for each color of image data that are output from the interline correction circuits 15R, 15G and 15B. Each of the interline correction circuits 15R, 15G and 15B performs correction by delaying the image data of colors except the reference color using field memories.

The area determining portion 22 outputs the signal indicating the decision result mentioned above and other signals indicating black letter regions, inner edges, outer edges, black edge correction quantity or other information.

Though illustration is omitted, the image processing apparatus M1B includes a reference drive pulse generation portion, a line buffer portion, a histogram generation portion and an ACS decision portion. The reference drive pulse generation portion generates a clock signal used for each process of the CCD sensor 12 and other portions. The line buffer portion memorizes one line of red, green and blue image data read by the CCD sensor 12. The histogram generation portion generates lightness data from the red, green and blue image data obtained by the primary scanning, and generates a histogram of the data on the memory. The ACS decision portion decides whether each dot is a color dot or not in accordance with the chroma data, counts the number of color dots in each block region having 512×512 dots on the original image so as to decide whether the region is a color region or a monochromatic region.

Furthermore, the one-dot width black fine line detection portion 23 that is explained in the first embodiment can be provided. In the image processing apparatus M1B, the arrangement order of the portions, i.e., the order of processing the image data can be changed from that explained above.

Figure 13:
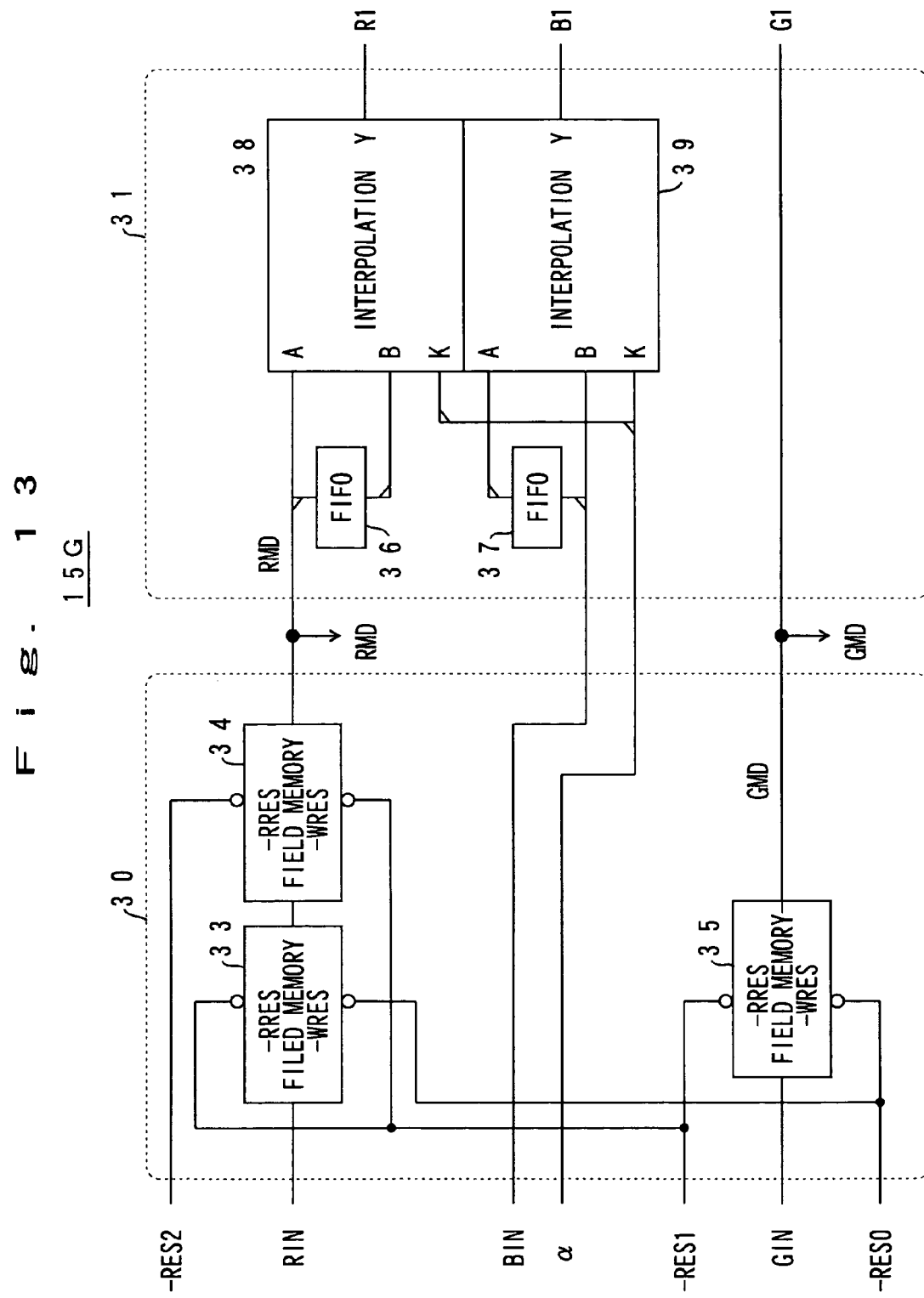
FIG. 13 is a block diagram of the interline correction circuit.
Figure 14:
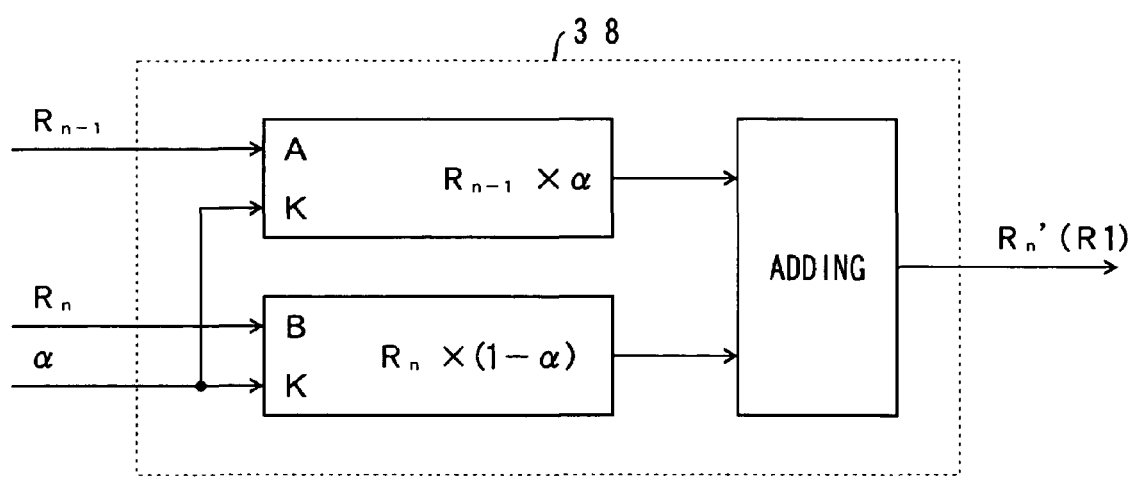
FIG. 14 is a block diagram showing an example of configuration of an interpolation operating portion.

FIG. 13 is a block diagram of an interline correction circuit 15G. FIG. 14 is a block diagram showing an example of configuration of an interpolation operating portion 38.

The interline correction circuit 15G explained here is a correction circuit using the green color as the reference color. The interline correction circuit 15R using the red color as the reference color and the interline correction circuit 15B using the blue color as the reference color have the same basic configuration and operation as the interline correction circuit 15G, so their detail explanation will be omitted.

In FIG. 13, the signals RIN, BIN and GIN are image data inputs of red, blue and green color, respectively. These image data inputs RIN, BIN and GIN are delayed for correction in the first correction portion 30 by the time corresponding to integral lines, and the second correction portion 31 gives them an interpolation process for a fraction portion to be image data outputs R1, B1 and G1. Other operation of the interline correction circuit 15G is the same as the interline correction circuit 15 shown in FIG. 2 of the first embodiment.

FIGS. 3–5 and their explanation of the first embodiment can be adopted for the second embodiment too.

The obtained red delayed image data and the green delayed image data are given to the second correction portion 31 along with the blue image data that is not delayed. The second correction portion 31 outputs the green delayed image data without the correction process as the image data output G1 and gives the interpolation process to the red delayed image data and the blue image data with reference to the green delayed image data.

Figure 17:
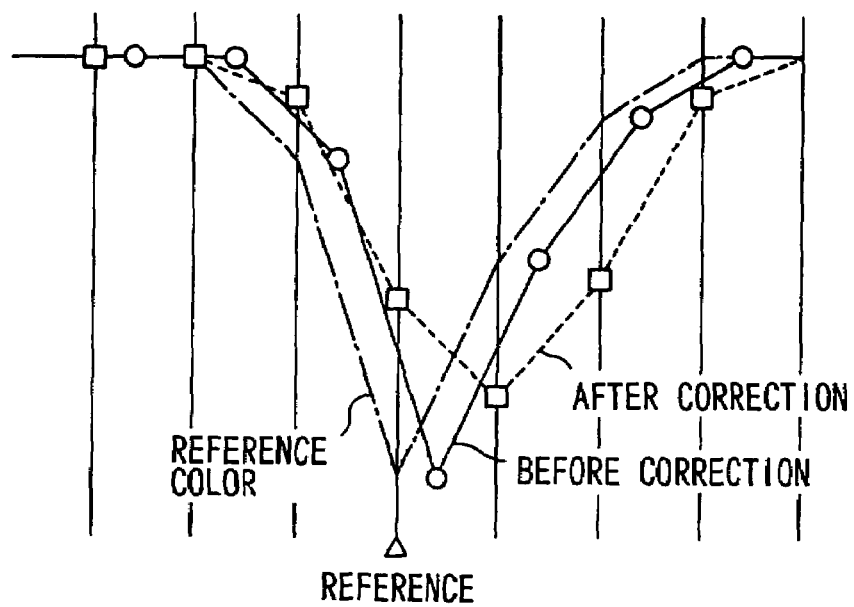
FIG. 17 is a diagram showing a variation of density by the correction of a fine line.
Figure 18:
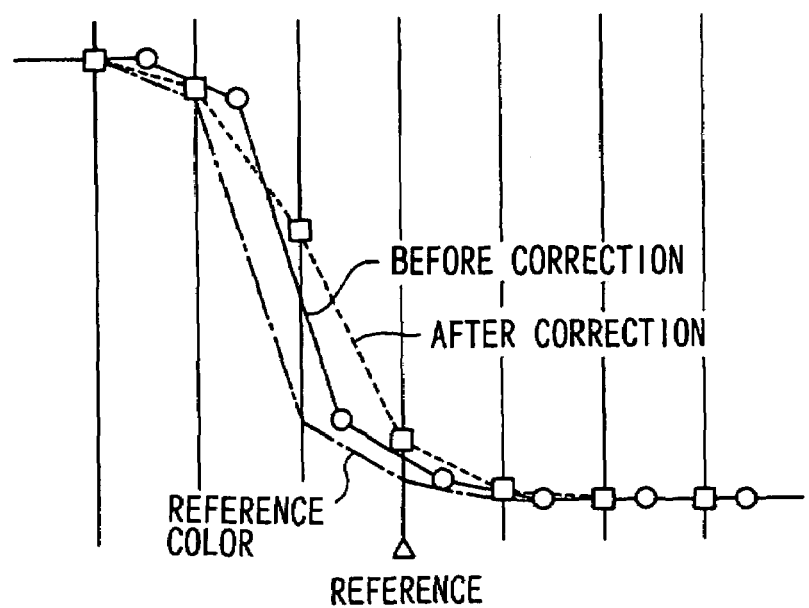
FIG. 18 is a diagram showing a variation of density by the correction of a portion except a fine line.

FIG. 17 is a diagram showing a variation of density by the correction of a fine line. FIG. 18 is a diagram showing a variation of density by the correction of a portion except the fine line.

As understood from FIGS. 17 and 18, the densities of the image data shifted from the reference color are decreased by the correction.

Therefore, in this embodiment, each of three interline correction circuits 15R, 15G and 15B using red, green and blue colors as the reference color, respectively, performs interpolation process, and the correction output portion 15A calculates the average for each color of image data that are output from the interline correction circuits 15R, 15G and 15B as shown in FIG. 12.

In FIG. 12, the correction output portion 15A calculates the average for each color of image data that the interline correction circuits 15R, 15G and 15B output, and outputs the image data ROUT, GOUT and BOUT as shown by the following equation.

$$ROUT=(R0+R1+R2)/3$$

$$GOUT=(G0+G1+G2)/3$$

$$BOUT=(B0+B1+B2)/3$$

Figure 15:
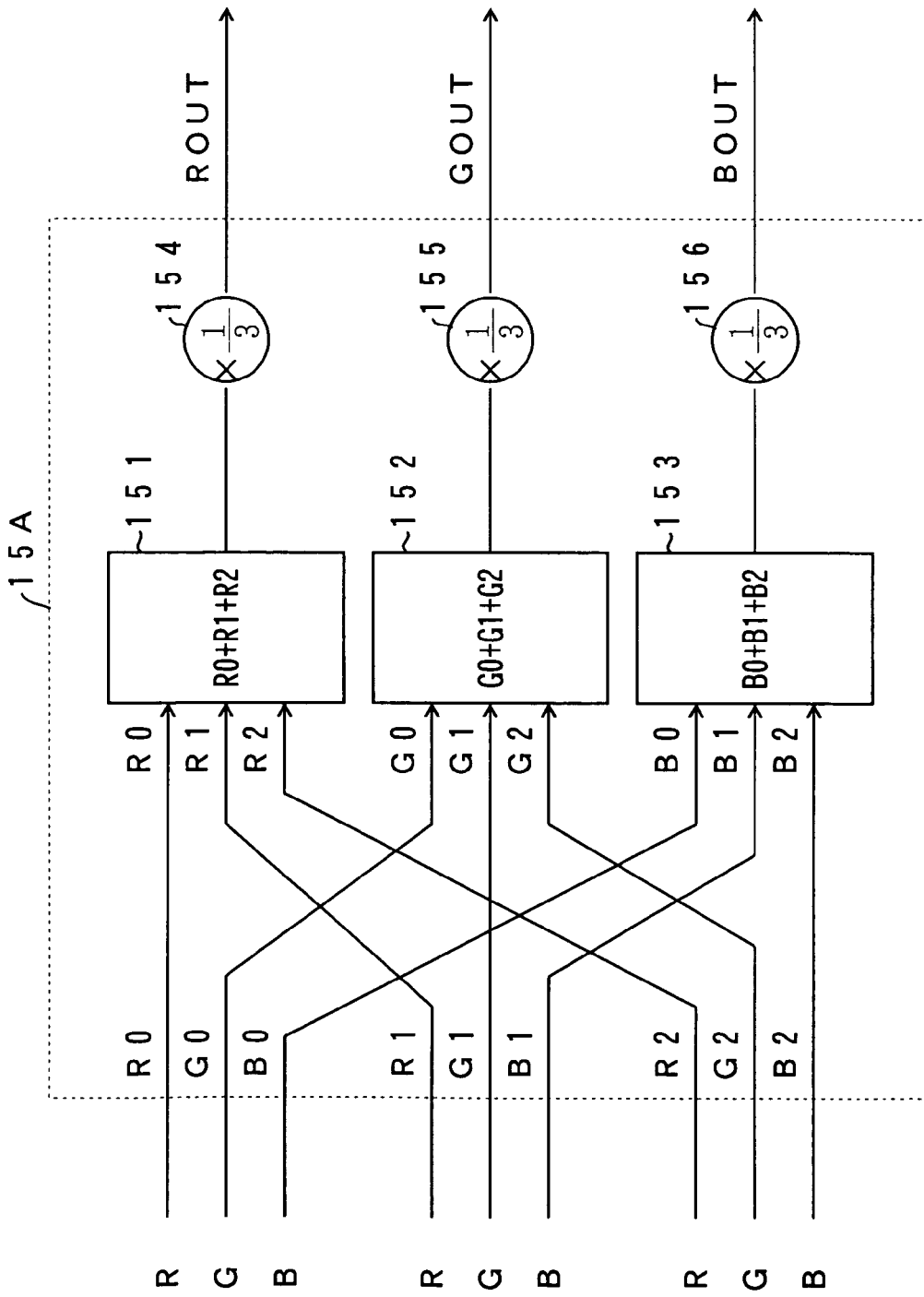
FIG. 15 is a block diagram showing an example of configuration of a correction output portion.
Figure 16:
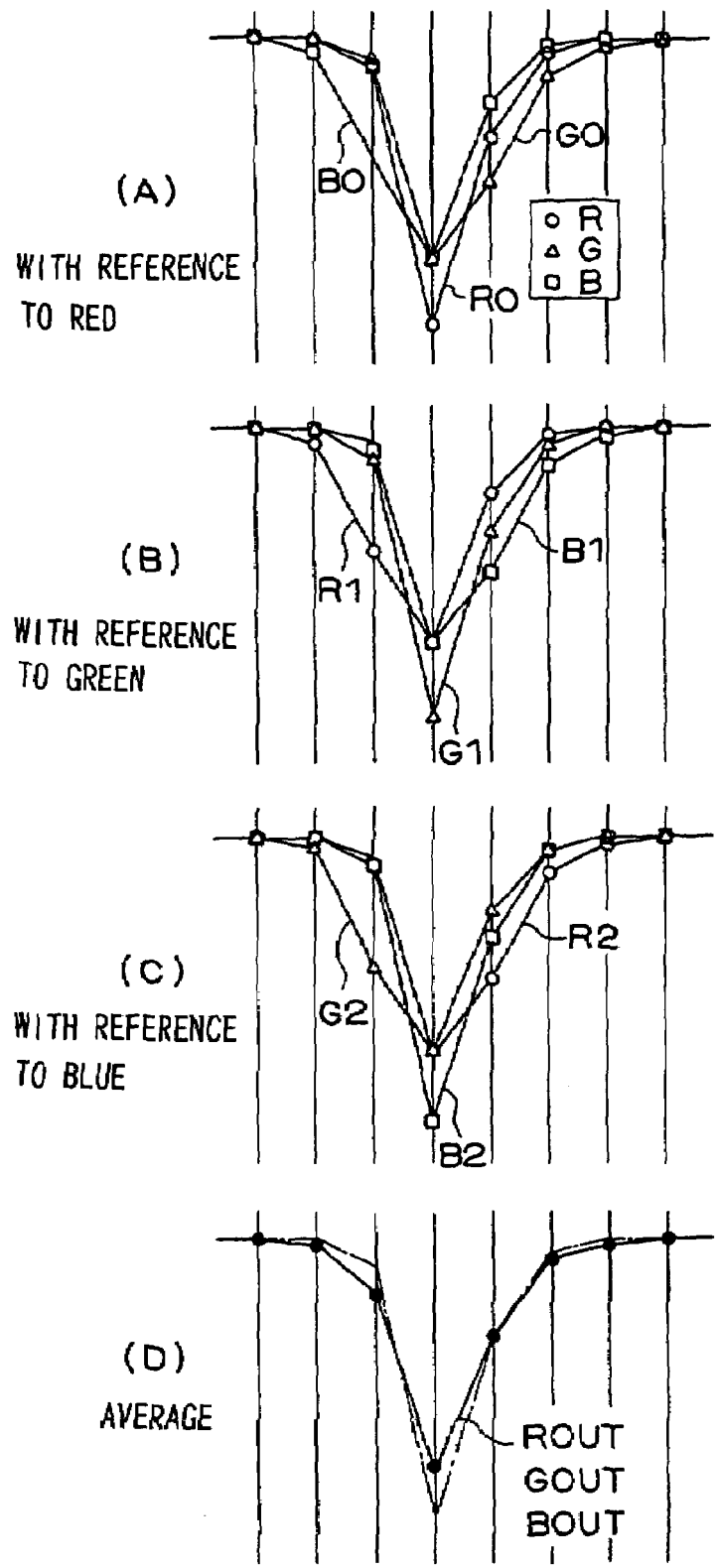
FIG. 16 is a diagram for explaining an operation of the correction output portion.

FIG. 15 is a block diagram showing an example of configuration of the correction output portion 15A. FIG. 16 is a diagram for explaining an operation of the correction output portion 15A.

As shown in FIG. 15, the correction output portion 15A can be made of three adders 151–153 and three dividers (or multipliers) 154–156.

FIG. 16 shows the image data in the case where the densities of the red, green and blue colors are equal to each other, i.e., where an achromatic color is read ideally. In FIG. 16, (A) shows the image data R0, G0 and B0 obtained by correcting with reference to the red color, (B) shows the image data R1, G1 and B1 obtained by correcting with reference to the green color, (C) shows the image data R2, G2 and B2 obtained by correcting with reference to the blue color, and (D) shows the image data ROUT, GOUT and BOUT that are averages thereof. In this example, the three image data ROUT, GOUT and BOUT after the average operation are equal to each other.

Since the average is calculated for each color of the image data that the three interline correction circuit 15R, 15G and 15B output after correction using the red, green and blue color as the reference color, the image data after interline correction can be obtained and the correction of the phase shift between the element arrays of the CCD sensor 12 can be performed precisely. In addition, the density balance among the red, green and blue colors can be maintained. As a result, the reproducibility of the black fine line can be improved.

In the embodiment explained above, the distance d between the element arrays is four and the distance 2d is eight. However, other values can be used. For example, the distance d can be eight and the distance 2d can be sixteen. In addition, non-integral values can be used. Instead of calculating the average of the image data that the three interline correction circuit 15R, 15G and 15B output, a weighted coefficient can be used or a root-mean-square value can be calculated. In addition, the corrected image data can be obtained in accordance with the image data from the two interline correction circuits.

In the embodiment explained above, the interline correction portion 15 and the interline correction circuits 15R, 15G and 15B can be made of hardware circuits or software programs that a CPU performs or a combination thereof.

According to the second embodiment, the correction of the phase shift between the element arrays can be performed as precisely as possible, and the reproducibility of black fine lines can be improved.

Third Embodiment

The configuration and operation of an image processing apparatus M1C of a third embodiment are similar to those of the second embodiment explained with reference to FIG. 11, so the explanation of them is omitted.

Figure 19:
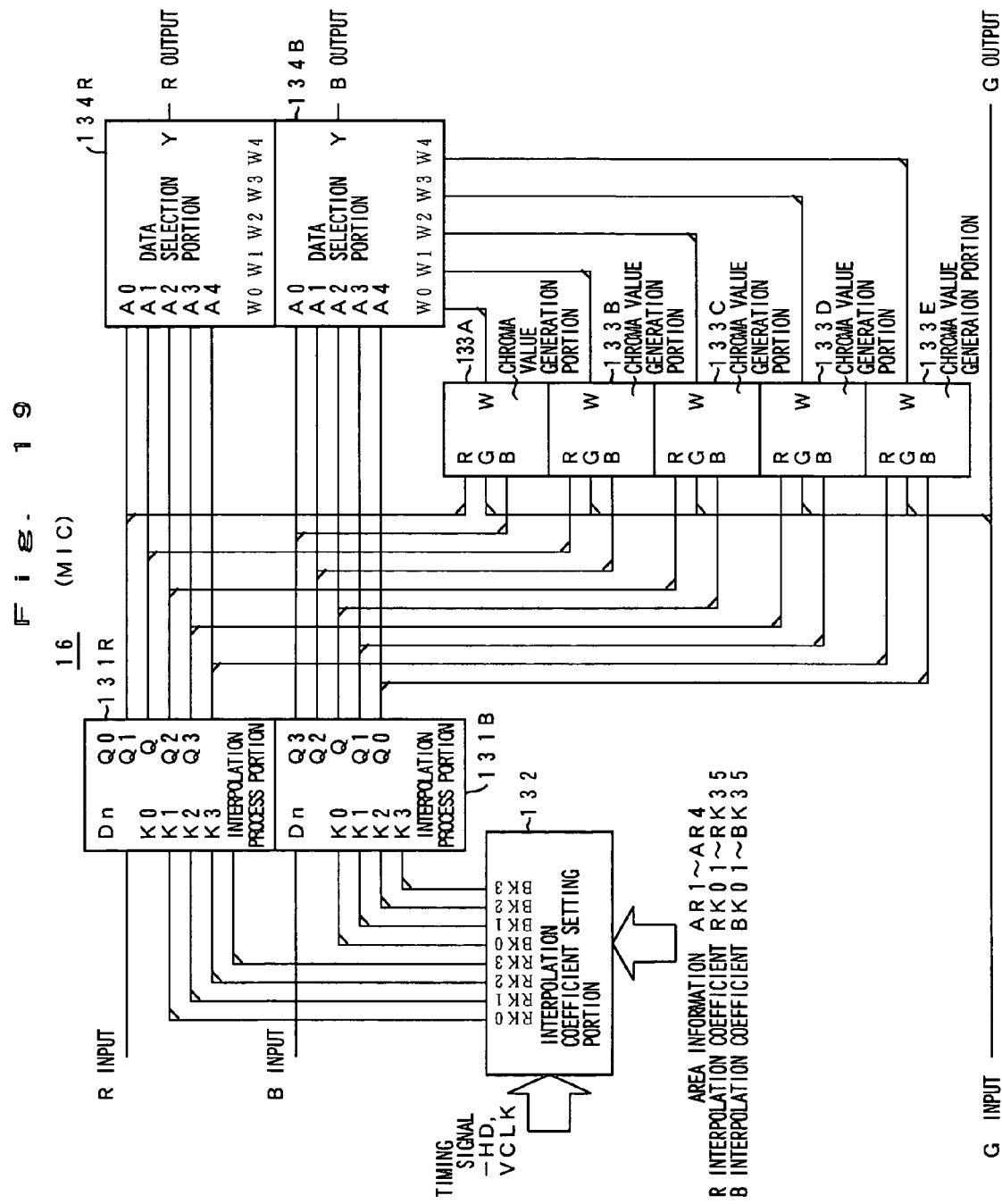
FIG. 19 is a diagram showing an example of a circuit of a chromatic aberration correction portion included in an image processing apparatus according to a third embodiment.

FIG. 19 shows an example of a circuit of the chromatic aberration correction portion 16. The chromatic aberration correction portion 16 includes interpolation process portions 131R and 131B, an interpolation coefficient setting portion 132, chroma value generation portions 133A–133E, and data selection portions 134R and 134B. The interpolation process portions 131R, 131B and the data selection portions 134R, 134B are provided for each of the red image data and the blue image data, but are not provided for the green image data. The green image data that has a high visibility are not processed the interpolation, and the input green image data are passed to be output data. The red image data and the blue image data are corrected about their phase shift with reference to the green image data.

Each of the interpolation process portions 131R and 131B uses interpolation coefficients given by the interpolation coefficient setting portion 132 so as to perform the interpolation process as shown in the following equations (5)–(9), and outputs five interpolation data Q0, Q1, Q, Q2 and Q3.

$$Q0=(1-K0)\times D_n+K0\times D_{n+1} \quad (5)$$

$$Q1=(1-K1)\times D_n+K1\times D_{n+1} \quad (6)$$

$$Q=D_n \quad (7)$$

$$Q2=(1-K2)\times D_n+K2\times D_{n-1} \quad (8)$$

$$Q3=(1-K3)\times D_n+K3\times D_{n-1} \quad (9)$$

In the equations (5)–(9), $D_n$ indicates the n-th pixel data in the primary scanning direction. $D_{n+1}$ indicates the (n+1)th pixel data, i.e., the pixel data after the $D_n$. $D_{n-1}$ indicates the (n−1)th pixel data, i.e., the pixel data before the $D_n$. K0–K3 mean the interpolation coefficients RK0–RK3 for the red image data given by the interpolation coefficient setting portion 132, or the interpolation coefficients BK0–BK3 for the blue image data.

The equation (5) means that the output data Q0 is the result of the interpolation process between the present (n-th) pixel data $D_n$ and the following (n+1)th pixel data $D_{n+1}$ using the interpolation coefficient K0. For example, K0 is set to ¼. In this case, the output data Q0 can be obtained that are the n-th pixel data shifted toward the (n+1)th pixel by K0=¼.

In the same way, the equation (6) means that the output data Q1 is the result of the interpolation process between the present (n-th) pixel data $D_n$ and the following (n+1)th pixel data $D_{n+1}$ using the interpolation coefficient K1. K1 is less than K0 and is set to ⅛, for example. In this case, the output data Q1 can be obtained that are the n-th pixel data shifted toward the (n+1)th pixel by K1=⅛.

The equation (7) means that the output data Q is equal to the present (n-th) pixel data $D_n$.

The equation (8) means that the output data Q2 is the result of the interpolation process between the present (n-th) pixel data $D_n$ and the previous (n−1)th pixel data $D_{n-1}$ using the interpolation coefficient K2. For example, K2 is set to ⅛. In this case, the output data Q2 can be obtained that are the n-th pixel data shifted toward the (n−1)th pixel by K2=⅛.

In the same way, the equation (9) means that the output data Q3 is the result of the interpolation process between the present (n-th) pixel data $D_n$ and the previous (n−1)th pixel data $D_{n-1}$ using the interpolation coefficient K3. K3 is greater than K2 and is set to ¼, for example. In this case, the output data Q3 can be obtained that are the n-th pixel data shifted toward the (n−1)th pixel by K3=¼.

As explained above, five interpolated output data Q0, Q1, Q, Q2, and Q3 that have different interpolation directions (shift directions) and interpolation quantities (including zero) are obtained for each of the red image data and the blue image data. The method for generating the interpolation coefficients K0–K3 of the interpolation coefficient setting portion 132, i.e., the interpolation coefficients RK0–RK3 for the red image data and the interpolation coefficients BK0–BK3 for the blue image data will be explained below.

The five interpolation output data Q0, Q1, Q, Q2 and 03 for the red image data and the blue image data are imparted to the five chroma value generation portion 133A–133E as five pairs of data. As explained above, the directions of the phase shift of red image data and the blue image data due to the chromatic aberration are opposite with respect to the green image data. Therefore, the interpolated pair of red image data and blue image data for the correction is not a pair of outputs Q0 and Q0, but a pair of output Q0 of the red image data and the output Q3 of the blue image data, for example. On the contrary, the output Q3 of the red image data and the output Q0 of the blue image data make a pair. In the same way, the output Q1 and the output Q2 make a pair.

The five chroma value generation portions 133A–133E are supplied with the green image data without any process. Therefore, each of the chroma value generation portions 133A–133E is supplied with three color image data including the green image data without the interpolation process, the red image data after the interpolation process and the blue image data after the interpolation process. However, the red image data and the blue image data supplied to the center chroma value generation portion 133C are the output Q of the interpolation process portions 131R and 131B, and are image data substantially without the interpolation process.

The five chroma value generation portions 133A–133E calculates the difference between the maximum value MAX (red, green and blue) of the input red, green and blue image data and the minimum value MIN(red, green and blue) thereof, and outputs the result, i.e., the chroma value W=MAX(red, green and blue)–MIN(red, green and blue). The chroma value W output from the chroma value generation portions 133A–133E are imparted to the selection control terminals W0–W4 of the data selection portions 134R and 134B.

The data input terminals A0–A4 of the data selection portion 134R are supplied with the outputs Q0, Q1, Q, Q2 and Q3 of the interpolation process portion 131R. The data input terminals A0–A4 of the data selection portion 134B are supplied with the outputs Q3, Q2, Q, Q1 and Q0 of the interpolation process portion 131B. Each of the data selection portions 134R and 134B selects data input corresponding to the control signal of the minimum value from the control signals given to the five selection control terminals W0–W4, and outputs it from the output terminal Y.

Namely, if the input signal of the selection control terminal W0 is the minimum value, a pair of the output Q0 of the red image data and the output Q3 of the blue image data given to the data input terminal A0 is selected to be the red image data output and the blue image data output. If the input signal of the selection control terminal W1 is the minimum value, the output Q1 of the red image data and the output Q2 of the blue image data given to the data input terminal A1 are selected. If the input signal of the selection control terminal W2 is the minimum value, the output Q of the red image data and the output Q of the blue image data given to the data input terminal A2 are selected.

If the input signal of the selection control terminal W3 is the minimum value, the output Q2 of the red image data and the output Q1 of the blue image data given to the data input terminal A3 are selected. If the input signal of the selection control terminal W4 is the minimum value, the output Q3 of the red image data and the output Q0 of the blue image data given to the data input terminal A4 are selected.

Figure 20:
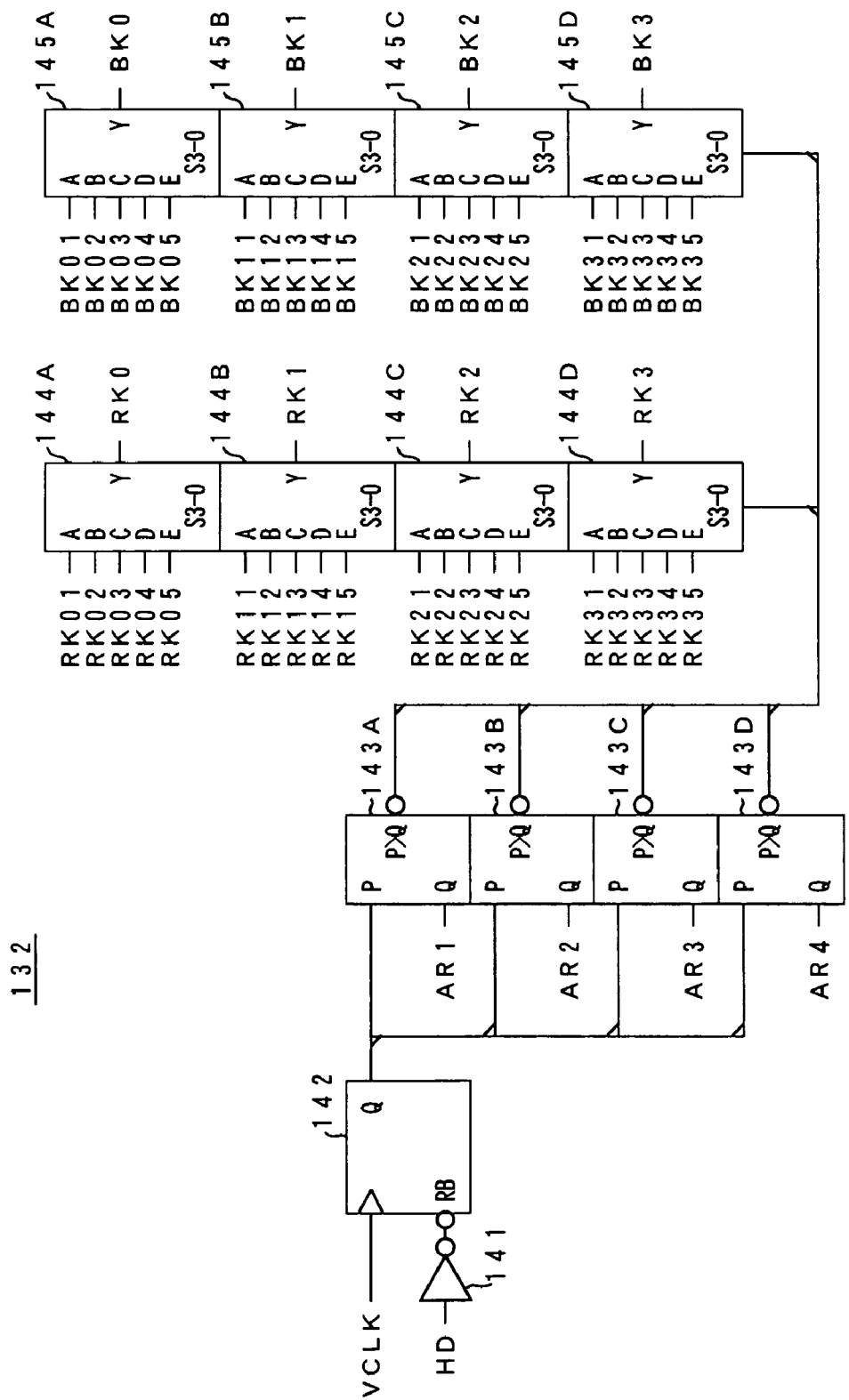
FIG. 20 is a diagram showing an example of a circuit of an interpolation coefficient setting portion included in the chromatic aberration correction portion.

FIG. 20 shows an example of a circuit of an interpolation coefficient setting portion 132. The interpolation coefficient setting portion 132 selects and outputs four proper red interpolation coefficients RK0–RK3 from predetermined four sets of five red interpolation coefficients RK01–05, RK11–15, RK21–25 and RK31–35 in accordance with an effective area signal HD, a pixel clock signal VCLK and an area information AR1–AR4. In the same way, the interpolation coefficient setting portion 132 selects and outputs four proper blue interpolation coefficients BK0–BK3 from predetermined four sets of five blue interpolation coefficients BK01–05, BK11–15, BK21–25 and BK31–35. The interpolation coefficient setting portion 132 includes an inverter 141, a counter 142, four comparators 143A–143D, four red interpolation coefficient selectors 144A–144D and four blue interpolation coefficient selectors 145A–145D.

Figure 21:
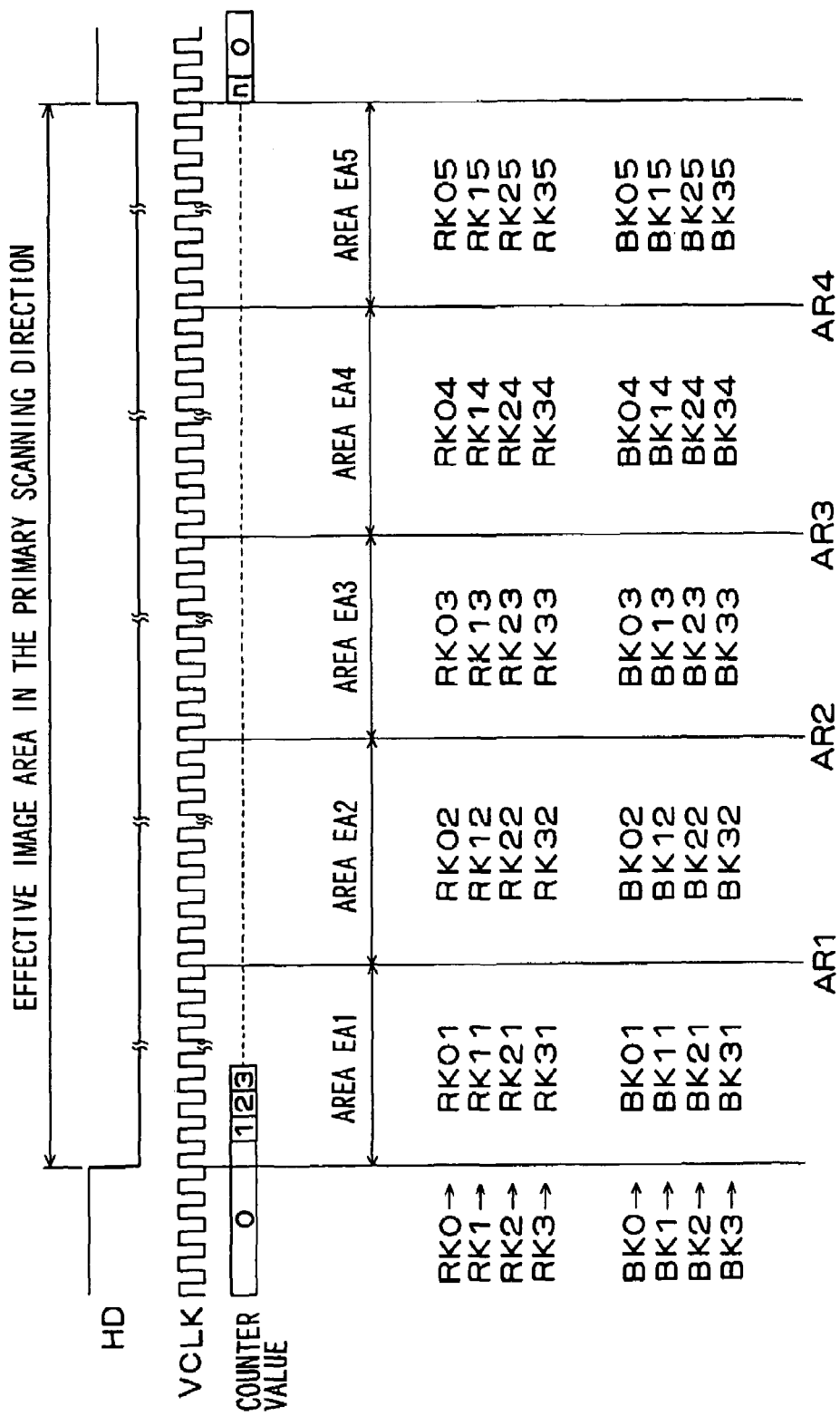
FIG. 21 is a timing chart for explaining the operation of the interpolation coefficient setting portion.

As shown in FIG. 21, the counter 142 starts counting the pulse of the pixel clock signal VCLK when the effective area signal HD that indicates the effective image area in the primary scanning direction turns from the high level to the low level. It counts n pulses (e.g., approximately 4,000 pulses) until the effective area signal HD turns back to the high level. As shown in FIG. 20, the effective area signal HD is given to the counter 142 through the inverter 141.

The counter 142 outputs its counter value in each timing, and the counter value is imparted to P inputs of four comparators 143A–143D. The Q inputs of the four comparators 143A–143D are supplied with four area information AR1–AR4 as reference values that are different from each other. The four area information AR1–AR4 are boundary addresses for dividing the whole area into five areas EA1–EA5 in the primary scanning direction where the relationship AR1<AR2<AR3<AR4 is satisfied.

Therefore, while the counter value of the counter 142 varies from 0 to n, the output of the comparator 143A whose Q input is supplied with the area information AR1 becomes active at first, and then, the output of the comparator 143B whose Q input is supplied with the area information AR2 becomes active, followed by the output of the comparator 143C whose Q input is supplied with the area information AR3 becoming active. Finally, the output of the comparator 143D whose Q input is supplied with the area information AR4 becomes active. Thus, five areas EA1–EA5 in the primary scanning direction can be determined from the outputs of four comparators 143A–143D.

Namely, as shown in FIG. 21, the effective image area is divided into five areas such as the area EA1 from the time when the effective area signal HD turns to the low level to the time when the output of the comparator 143A becomes active, the following area EA2 until the output of the comparator 143B becomes active, the following area EA3 until the output of the comparator 143C becomes active, the following area EA4 until the output of the comparator 143D becomes active, and the final area EA5 until the signal HD turns back to the high level.

The outputs of four comparators 143A–143D (hereinafter, referred to as an area decision signal) are imparted to the selection control terminals S3-0 of the four red interpolation coefficient selectors 144A–144D and the four blue interpolation coefficient selectors 145A–145D as four-bit data as shown in FIG. 20.

The first red interpolation coefficient selector 144A is a selector for setting the first interpolation coefficient RK0 for red image data that is the interpolation coefficient K0 used for the above-mentioned equation (5) for each area EA mentioned above. The five data input terminals A–E are supplied with five interpolation coefficients RK01–RK05 for the areas EA1–EA5, one of which is selected and output as the first interpolation coefficient RK0 in accordance with the area decision signal supplied to the selection control terminals S3-S0.

In the same way, the second red interpolation coefficient selector 144B selects one of the five interpolation coefficients RK11–RK15 and outputs it as the second interpolation coefficient RK1. The third red interpolation coefficient selector 144C selects one of the five interpolation coefficients RK21–RK25 and outputs it as the third interpolation coefficient RK2. The fourth red interpolation coefficient selector 144D selects one of the five interpolation coefficients RK31–RK35 and outputs it as the fourth interpolation coefficient RK3.

In the same way as the red interpolation coefficient selector 144A–144D explained above, the blue interpolation coefficient selectors 145A–145D select the first interpolation coefficient BK0 from the first set of interpolation coefficients BK01–BKO5, select the second interpolation coefficient BK1 from the second set of interpolation coefficients BK11–BK15, select the third interpolation coefficient BK2 from the third set of interpolation coefficients BK21–BK25, and select the fourth interpolation coefficient BK3 from the fourth set of interpolation coefficients BK31–BK35, in accordance with the decision signal of the areas EA1–EA5. The four selected interpolation coefficient BK0–BK3 are output.

Figure 22:
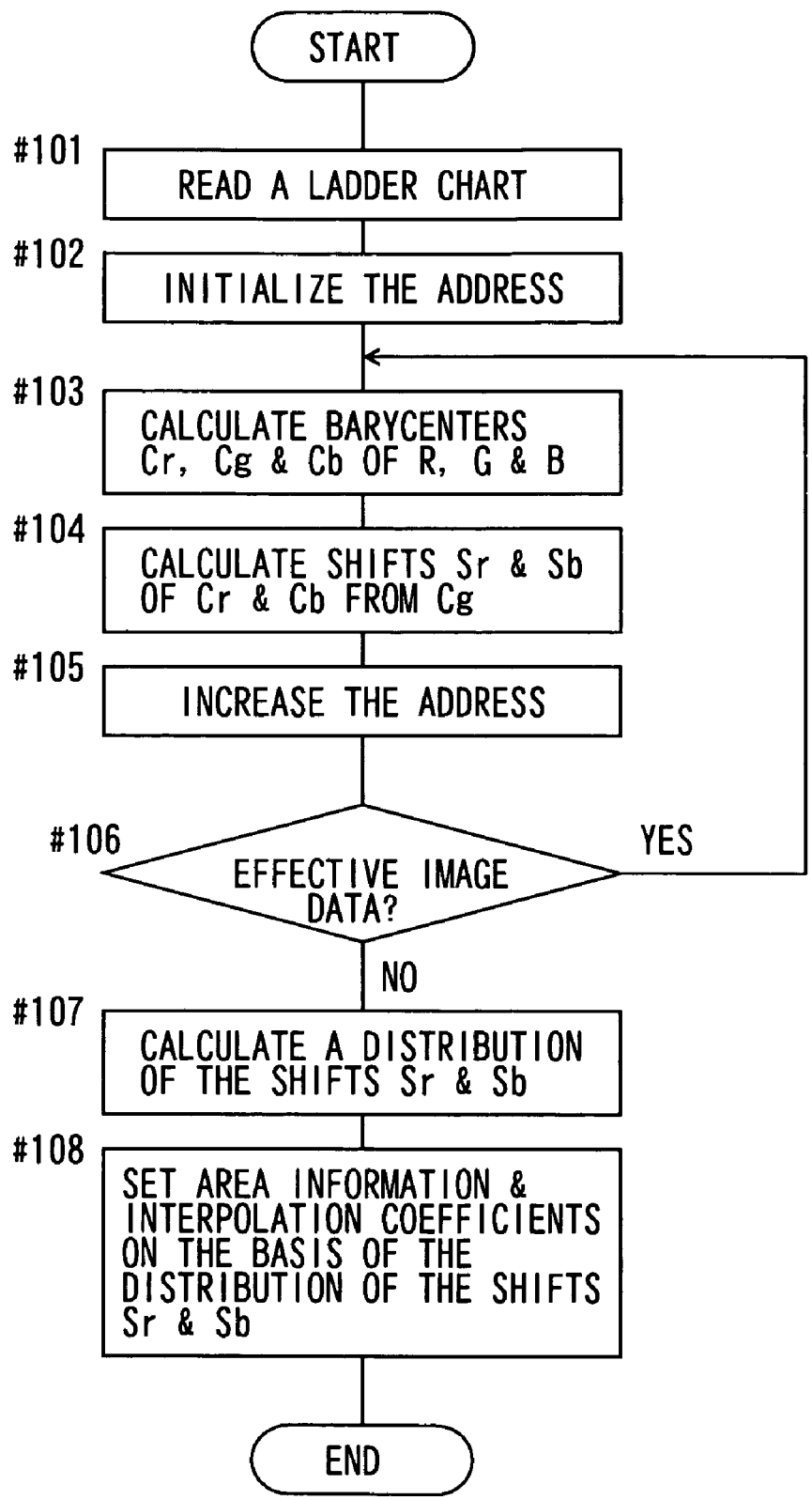
FIG. 22 is a flow chart of a process for setting a set of area information and the interpolation coefficient.

FIG. 22 is a flow chart of a method for setting the above-mentioned area information AR1–AR4 and the set of the interpolation coefficients RK01–05, RK11–15, RK21–25, RK31–35, BK01–05, BK11–15, BK21–25 and BK 31–35.

Figure 23:
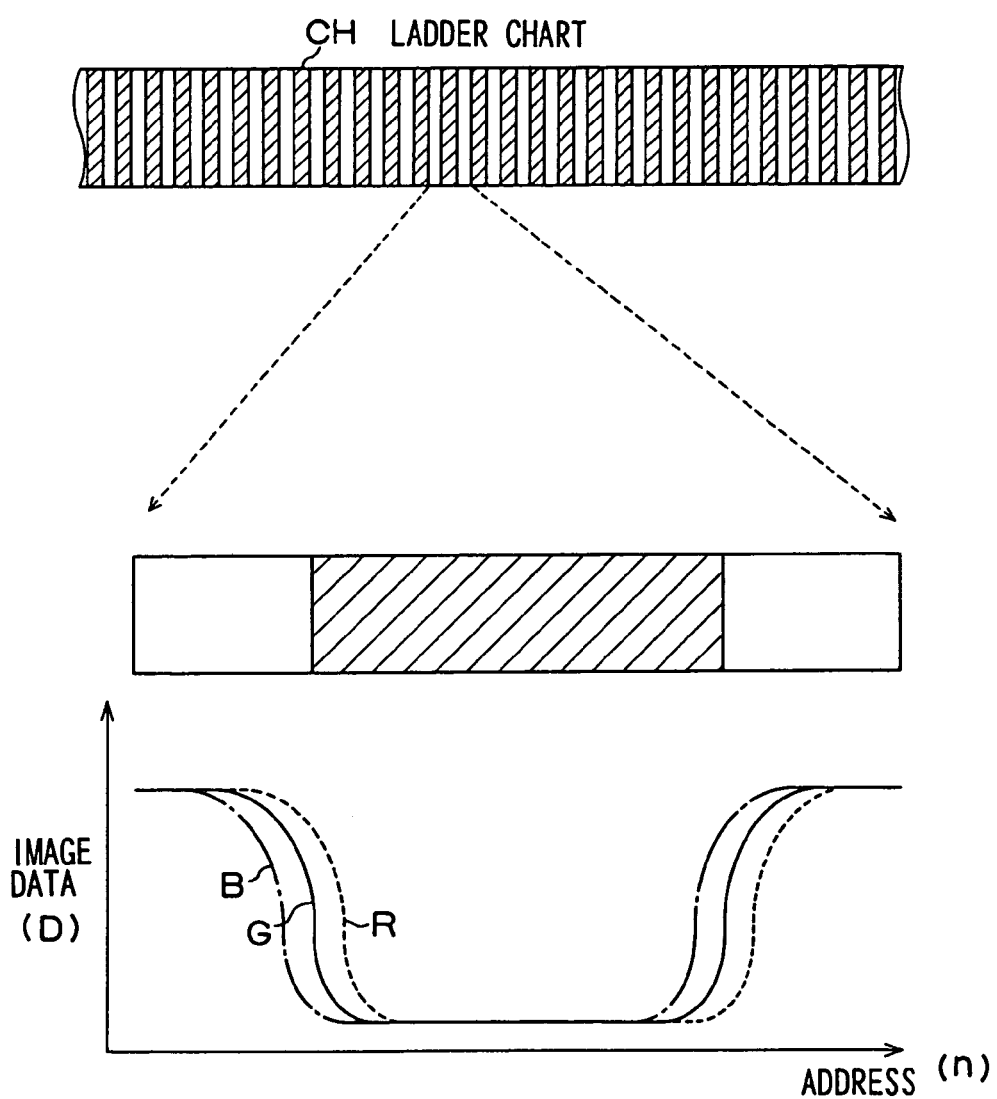
FIG. 23 is a diagram showing schematically a ladder chart and the image data thereof used for setting the set of area information and the interpolation coefficient.

First, an image of a ladder chart CH as shown in FIG. 23 is read (Step #101). The ladder chart CH is a test pattern in which black lines are arranged in the primary scanning direction by a predetermined pitch. The obtained red, green and blue image data have phases a little different from each other due to a chromatic aberration of a lens system. Namely, as shown in FIG. 23, the red image data of the broken line and the blue image data of the phantom line are shifted in the opposite direction with respect to the green image data of the full line. The distribution of this shift is determined quantitatively as follows.

In order to determine the shift from one end in the primary scanning direction, the address is initialized (Step #102). Next, barycenters Cr, Cg and Cb of the red, green and blue image data for the image data region corresponding to the black line portion of the ladder chart in accordance with the following equation (10) (Step #103).

$$\text{barycenter} = \Sigma(D \times n)/n \quad (10)$$

where D is image data(reflectivity data) of each color, and n is an address in the primary scanning direction.

Next, with reference to the barycenter Cg of the green image data, the shift Sr=Cr−Cg of the barycenter Cr of the red image data and the shift Sb=Cb−Cg of the barycenter Cb of the blue image data are calculated (Step #104). Usually, these shifts Sr and Sb become larger in the portion closer to the ends in the primary scanning direction. The address is increased by a predetermined quantity (Step #105). The process from Step #103 to Step #105 is repeated within the effective image area (Step #106), i.e., until reaching the other end in the primary scanning direction.

Thus, the distribution of the shifts Sr and Sb of the barycenters Cr and Cb of the red image data and the blue image data from the barycenter Cg of the green image data is determined by a predetermined address pitch (Step #107).

Figure 24:
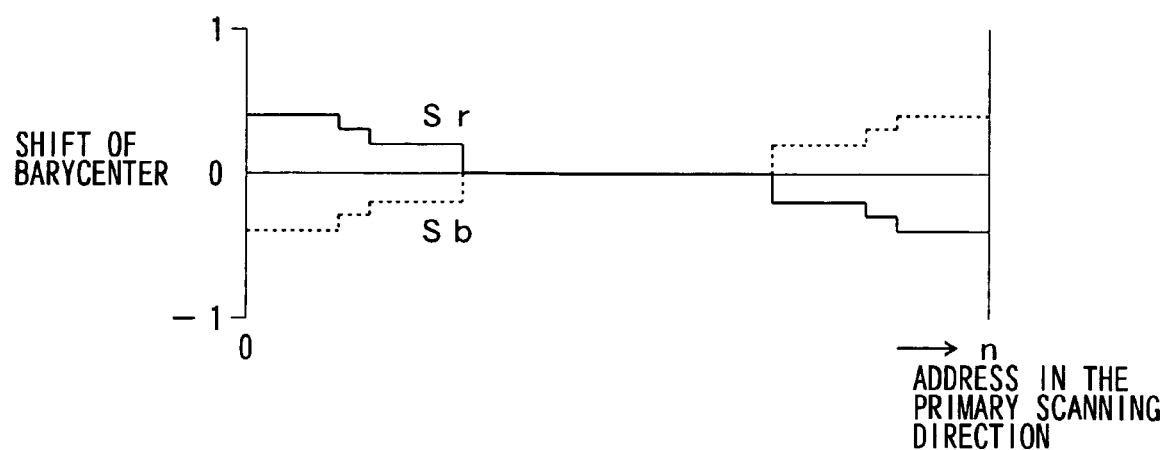
FIG. 24 is a diagram showing an example of distribution of shift of a barycenter.

An example of the distribution of shifts Sr and Sb is shown in FIG. 24. Finally, the area information (the boundary addresses of plural areas) and the set of interpolation coefficients RK and BK are set for each area in accordance with the distribution of shifts Sr and Sb.

According to the process explained above, the chromatic aberration can be corrected by detail interpolation in accordance with the characteristics of the lens system.

In the above-mentioned example, the whole area in the primary scanning direction is divided into five areas EA1–EA5. In the center area EA3, the phase shift due to the chromatic aberration hardly becomes a problem, so the interpolation coefficient is set to zero so as not to perform the interpolation process substantially. In the neighboring areas EA2 and EA4, the interpolation coefficient is set to ⅛ so as to perform the correction (interpolation) by shifting the red image data and the blue image data by the ⅛ dot in the opposite direction with respect to the green image data. In the outer edge areas EA1 and EA5, the interpolation coefficient is set to ¼ so as to perform the correction (interpolation) by shifting the red image data and the blue image data by the ¼ dot in the opposite direction with respect to the green image data.

Therefore, in this case, three interpolation coefficient values 0, ⅛ and ¼ are predetermined, and only the area information AR should be set in Step #108 of FIG. 22. Namely, the area information AR2 and AR3 are set that are boundaries between area EA3 of the interpolation coefficient 0 and the area EA2, EA4 of the interpolation coefficient ⅛, and the area information AR1 and AR4 are set that are the boundaries between the area EA1 and EA2 and between the area EA1 and EA4 in accordance with the distribution of the shifts Sr and Sb (see FIG. 21). Usually, this extent of area division is sufficient.

However, not limiting to the above-mentioned example, the area can be further divided in the primary scanning direction, so as to set the interpolation coefficient for each area. In addition, the interpolation coefficients of both side areas with respect to the center area are not always required to be symmetric. If the lens system has asymmetric characteristics, different interpolation coefficients can be set for the both side area, so as to correct the asymmetric characteristics. In addition, the interpolation coefficients of the red image data and the blue image data are not always required to be the same. Different values can be set for the interpolation coefficients in accordance with the characteristics of the lens system or other factor.

By the operation of the chroma value generation portions 133A–133E and the data selection portions 134R and 134B in FIG. 19, the red image data and the blue image data are selected after the correction (interpolation process) corresponding to the minimum chroma value. Therefore, even if the area information and the interpolation coefficient are set roughly to some extent, the red image data and the blue image data of the most appropriate correction quantity (interpolation quantity) are selected to be output. This is because that the chromatic aberration can be corrected more properly when the difference between the maximum value and the minimum value, i.e., the chroma value of the red, green and blue image data is smaller.

As explained above, according to the image processing apparatus M1C of the third embodiment, the phase shift between the image data of color components due to the chromatic aberration of the lens system can be corrected more properly for each of the plural areas divided in the primary scanning direction, and the correction quantity can be switched in accordance with the characteristics of the lens system and the image sensor.

In addition, the information for the correction of each area, e.g., boundaries of areas or the interpolation coefficient of each area can be automatically set in accordance with the characteristics of the machine equipped with the image processing apparatus.

Fourth Embodiment

Next, a fourth embodiment will be explained.

In the conventional color image processing apparatus, it is common to decide whether the present pixel is on the edge portion of a black line (or a black letter) for plural image data (R, G, B) having different wavelength component read by reading means including a CCD sensor, and also common to perform an image processing such as edge emphasizing if the present pixel is on the edge portion of a black line (or a black letter). According to this image processing, the reproducibility of the black fine line and the black letter included in the color image is improved.

First, the color image data obtained by reading an original image are passed through a first degree differential filter and a second degree differential filter so as to determine the edge portion. In addition, a black region such as a black line or a black letter is determined from the red, green and blue image signals as explained below. A black edge portion (an edge portion and a black region) is determined by the above-mentioned process. Furthermore, it is decided whether the present dot is outside the edge (on the background) or inside the edge (on the black region) in accordance with whether the output of the second degree differential filter is positive or negative. Hereinafter, the outside of the black edge is referred to as a black outer edge portion, and the inside of the black edge is referred to as a black inner edge portion.

In order to improve the reproducibility of the black letter or the black fine line, the following process is performed for the black inner edge portion and the black outer edge portion. For pixels on the black inner edge portion, the edge emphasizing process is performed in which the lightness edge component is added to the black image data Bk. In addition, for the color component image data C (cyan), M (magenta), and Y (yellow), the edge emphasizing process is not performed, and the image data of the present pixel is replaced with the pixel data of the minimum value (i.e., the lowest density) in a 5×5 or 3×3 pixel matrix.

For pixels of the black outer edge portion, edge emphasizing is not performed to any image data Bk, C, M and Y of the black component and color component, and the image data of the present pixel is replaced with the pixel data of the minimum value in a 5×5 or 3×3 pixel matrix.

By the above-mentioned process, the C, M, Y color components are suppressed in the vicinity of the edge of the black letter or the black fine line in the original image and the black inner edge is emphasized, so that the reproducibility of black letters and black fine lines is improved.

As explained above, the black edge decision portion includes an edge decision portion for deciding whether the present pixel is on the edge portion or not, and a chroma decision portion for deciding whether the present pixel is on the black (achromatic color) region or not. The chroma decision portion calculates the difference between the maximum value and the minimum value of the R, G, B color image signal as a chroma value, while the minimum value is used as a lightness value. If the chroma value is less than the threshold corresponding to the lightness, a black region (a black line or a black letter) of the achromatic color is determined.

However, it is difficult for the conventional chroma decision portion to determine the black region correctly when the balance among the three principal colors (R, G, B) due to an aberration of the optical system or the influence of the interline correction. This phenomenon can be generated particularly in the fine line easily. For example, one or two-dot black fine lines or black letters are not determined correctly to be an achromatic color, resulting in deterioration of the reproducibility.

Figure 30:
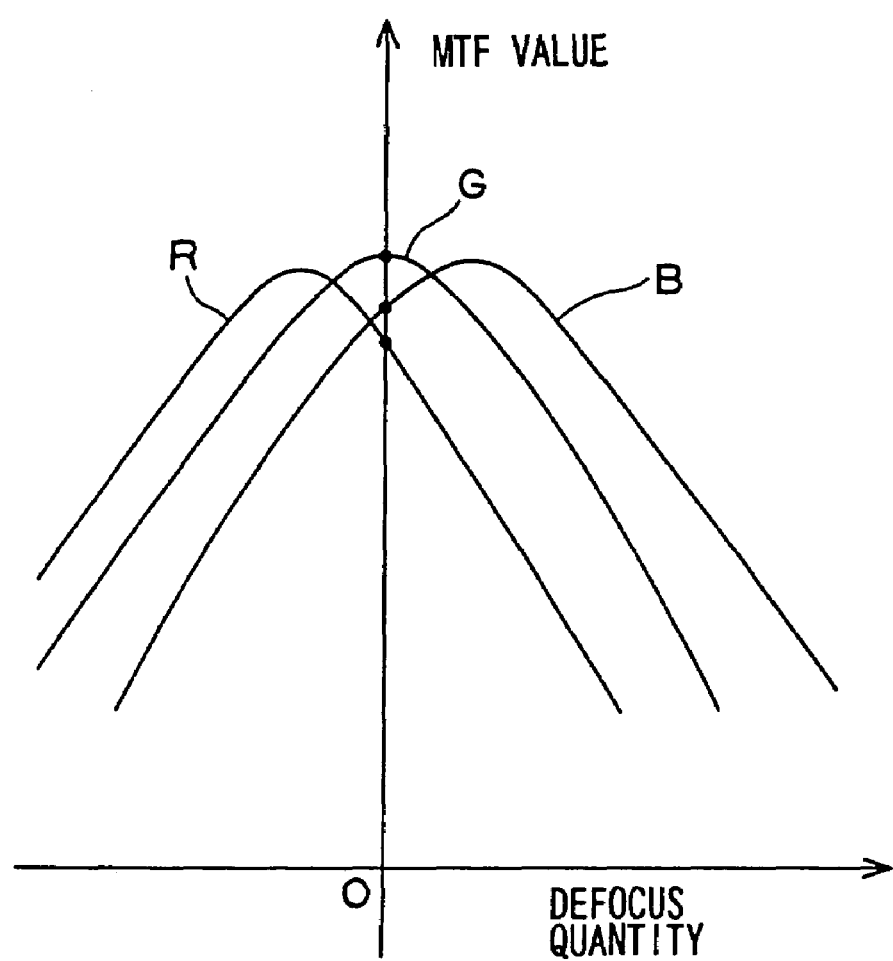
FIG. 30 is a diagram showing a generation of a difference between MTF's of red, green and blue colors due to an aberration of the optical system.

FIG. 30 shows a difference between modulation transfer functions (MTF's) of red, green and blue colors generated due to the aberration of the optical system. When reading a black image, the MTF's of red, green and blue colors are ideally the same. However, because of the difference of spectral wavelengths of red, green and blue colors, the MTF curve with respect to defocus of the optical system is shifted for each of red, green and blue colors. If the focusing plane is adjusted so that the defocus of the green image data becomes zero as shown in FIG. 30, the MTF's of red and blue colors as well as the density thereof are reduced.

Figure 31:
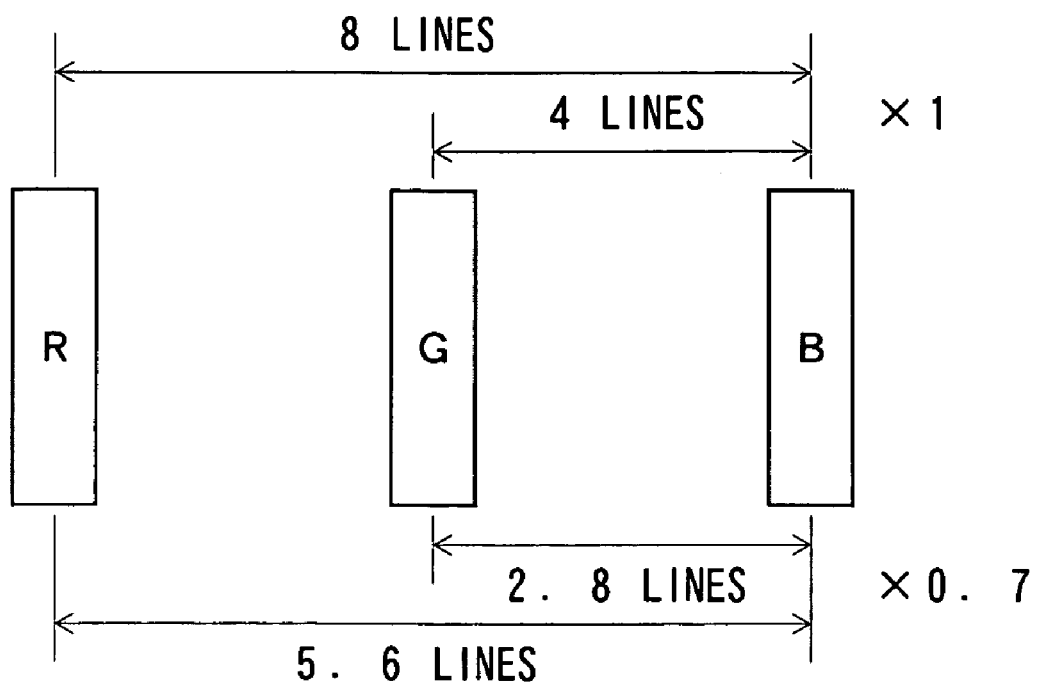
FIG. 31 is a diagram showing a misregistration among red, green and blue color lines of a CCD.
Figure 32:
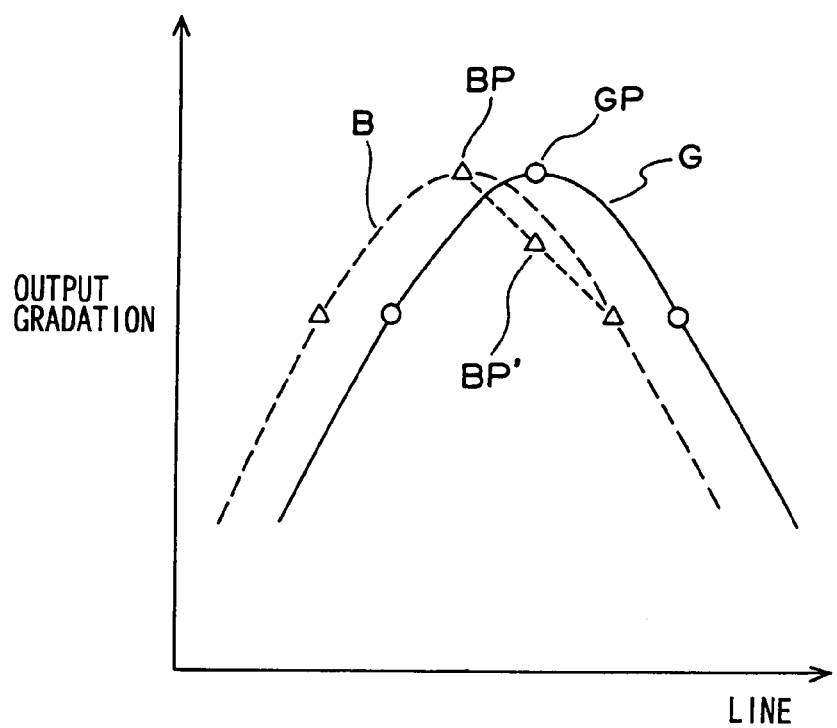
FIG. 32 is a diagram showing schematically a phenomenon of generating a difference between the peak value of the green image data and the peak value of the blue image data that is dropped by the interpolation process of the interline correction portion.

Losing of the density balance among R, G, B colors due to the interline correction will be explained with reference to FIGS. 31 and 32. FIG. 31 shows a misregistration among red, green and blue lines of a CCD sensor. FIG. 32 schematically shows an example of generation of the difference between the peak GP of the green signal (image data) and the peak BP' of the blue signal (image data) dropped from the peak BP due to the interpolation process by the interline correction portion.

A CCD line sensor called a contraction type has red, green and blue element arrays arranged by a predetermined pitch in the secondary scanning direction as schematically shown in FIG. 31. This pitch corresponds to four lines if the scaling ratio is one, for example. Since an original image is usually scanned in the order of red, green and blue, the green color signal is delayed four lines and the blue color signal is delayed eight lines from the red color signal.

In this case, the interline correction portion performs the interline correction in which the green color signal is delayed four lines from the blue color signal, and the red color signal is delayed four lines from the green color signal (eight lines from the blue color signal). Thus, the phases of red, green and blue image data will be aligned.

However, if the scaling ratio is not integer, the delay is not integral lines, and a fraction is generated. For example, as shown in FIG. 31, if the scaling ratio is 0.7, the green color signal is delayed 2.8 lines and the blue color signal is delayed 5.6 lines from the red color signal.

In this case where a delay of fraction is generated, an interpolation process is used for pseudo-delay of the fraction adding to the above-mentioned delay of integral lines.

For example, in order to delay the green color signal 5.6 lines from the blue color signal, interpolation process of 5-line delayed data and 6-line delayed data is performed so as to generate 5.6-line delayed data. In the real process, the interpolation process for the fraction is applied to the blue color signal with reference to the green color signal, so as to avoid the change of the green color signal that is the most visible for human eyes by the interpolation process. As a result, the peak BP of the blue color signal drops to BP' by the interpolation process, and the difference between the BP' and the peak GP of the green color signal is generated as shown in FIG. 32. The peak of the red color signal also drops by the interpolation process, thereby makes difference from the peak of the green color signal.

As explained above, when the density balance between the reference green image data and the other red or blue image data is lost due to the aberration of the optical system or the influence of the interline correction, the precise decision of chromatic color or achromatic color in accordance with the difference (chroma value) between the maximum value and the minimum value becomes difficult. As a result, edge emphasizing process for one or two-dot black fine lines or black letters is not performed, and the black lines or letters is printed in a greeny color.

Therefore, in the fourth embodiment, a color image processing apparatus is provided that can improve the reproducibility of black fine lines or black letters. The language "black fine line" usually includes a black fine line and black letter.

Figure 29:
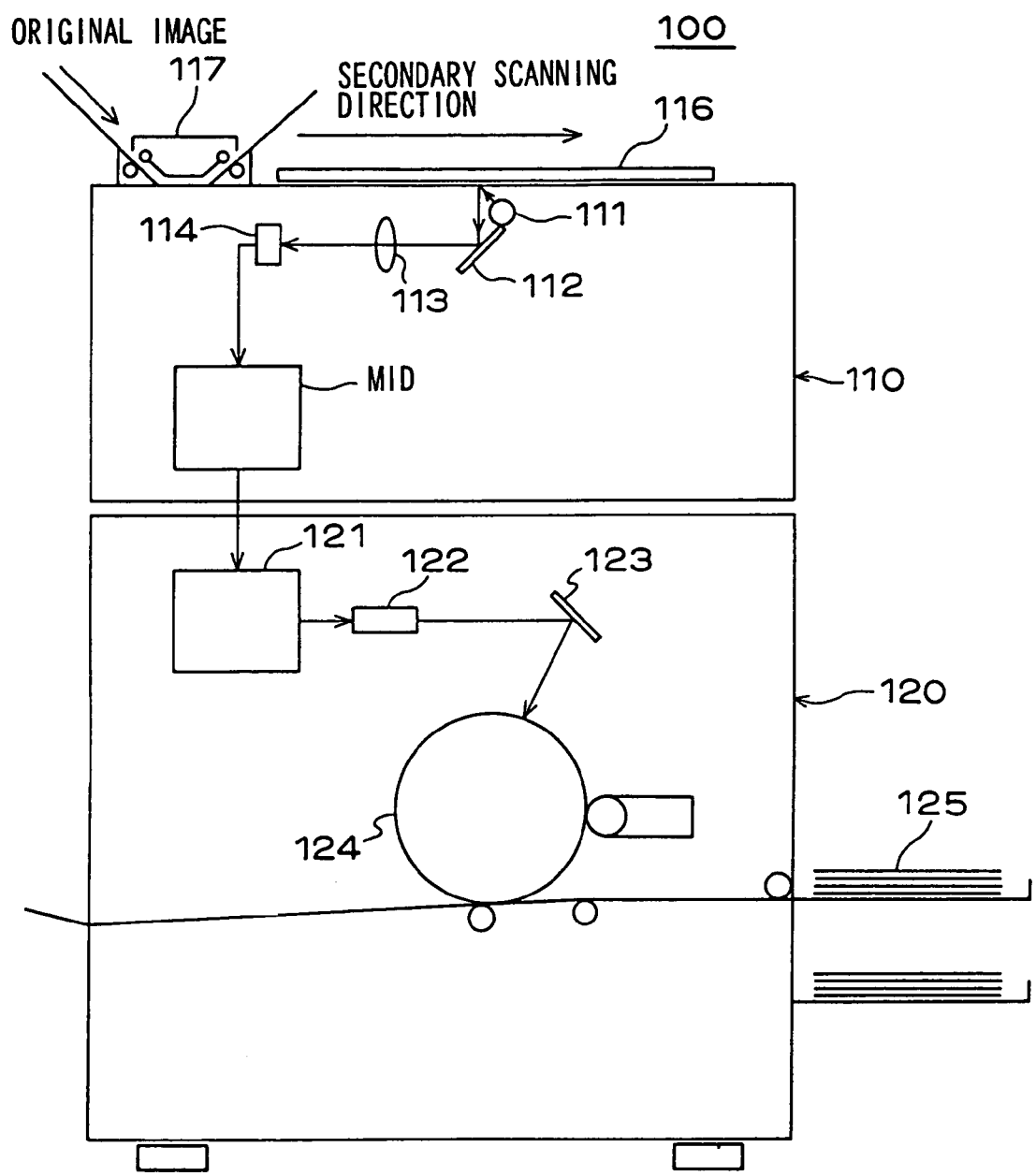
FIG. 29 is a diagram showing an overall structure of a digital color copying machine.

FIG. 29 is a diagram showing an overall structure of a digital color copying machine to which an image processing apparatus M1D of the fourth embodiment is applied.

In FIG. 29, the digital color copying machine 100 includes an image reading device (reading means) 110 disposed at the upper portion thereof and an image recording device 120 disposed at the lower portion thereof. The image reading device 110 includes a manually-placed original reading device 116 and an automatically-fed original reading device 117.

The image reading device 110 irradiates a light beam from a light source 111 onto the original image, and the light beam reflected by the original image passes through a contraction optical system including a mirror 112 and a lens 113 so as to reach a CCD 114 that is a linear image sensor. The CCD 114 converts the image of the original into an analog signal by photoelectric conversion and charge transfer. For example, the resolution of the CCD 114 is 400 dpi, the maximum original size is A3. In this case, one line in the primary scanning direction has approximately 5,000 dots.

The analog signal output by the CCD 114 is given to the image processing apparatus M1D. The image processing apparatus M1D converts the analog signal into digital data, applies image processing such as scaling or image quality correction to the data, and output the processed digital data as digital image data from the image reading device 110.

The scanning as reading the original is performed in the primary scanning direction that is a direction of scanning elements of the CCD 12 (i.e., the longitudinal direction of the CCD12) and in the secondary scanning direction perpendicular to the primary scanning direction.

The scanning in the secondary scanning direction is performed by the horizontal movement of the mirror 112 in the case of the manually-placed original, while it is performed by feeding the original in the case of the automatically-fed original. In each case, the image signal is transferred sequentially one by one line of the primary scanning direction.

The image recording device 120 converts the digital image data given by the image reading device 110 into an analog signal in a laser diode drive unit 121, converts it into light in a laser diode 122, and forms the image on the photosensitive drum 124 by the light through a polygon mirror 123. Current supplied to the laser diode 122 is controlled, and the light emitted by the laser diode 122 is controlled for each pixel. Thus, the photosensitive drum 124 forms a latent image, which developed by toner to be transferred onto a printing paper 125. Thus, an image of 400 dpi and 256-step gradation is formed by the electrophotographic technology.

Figure 25:
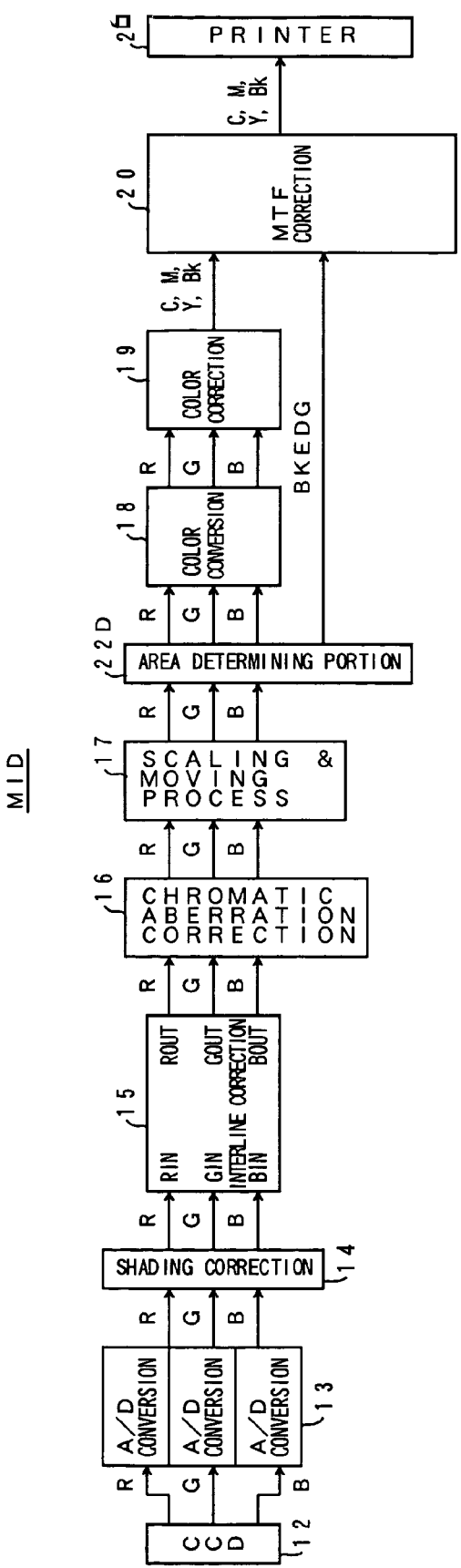
FIG. 25 is a block diagram of an image processing apparatus of a fourth embodiment.

FIG. 25 is a block diagram showing an overall structure of an image processing apparatus M1D of a fourth embodiment.

The element having the same function as in the image processing apparatus M1 of the first embodiment is denoted by the same reference numeral, and the explanation thereof is omitted or simplified.

In FIG. 25, the interline correction portion 15 is a circuit for correcting the phase shift of the red, green and blue image signals (data) due to the misregistration among the red, green and blue lines of the CCD 12.

Figure 26:
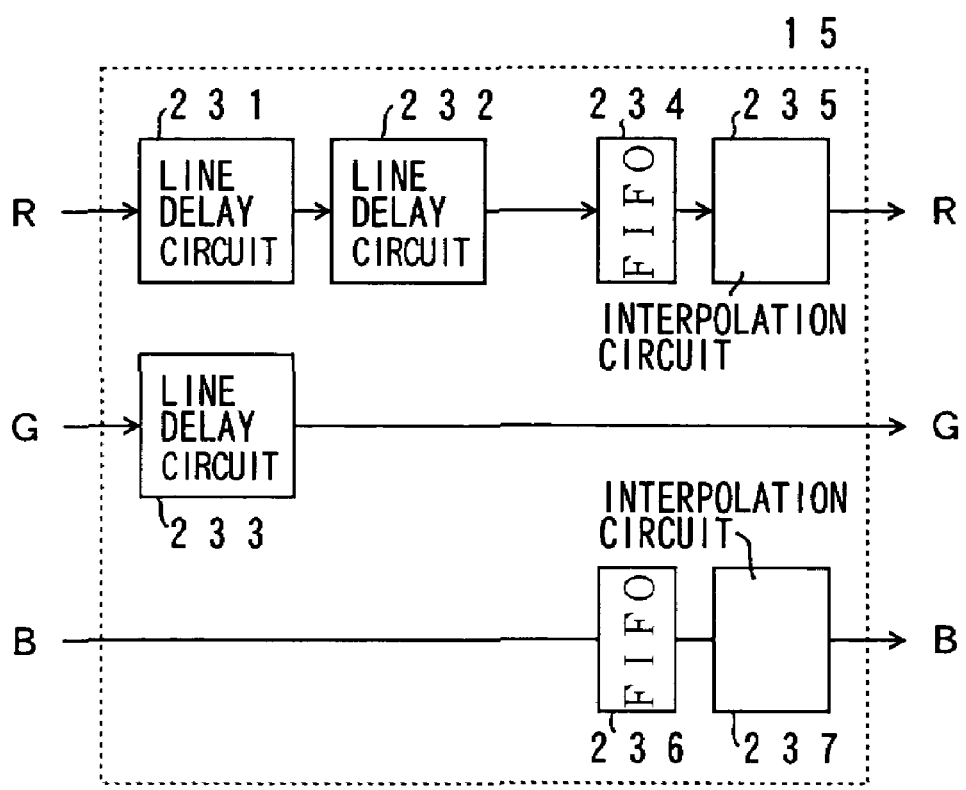
FIG. 26 is a block diagram showing an internal configuration of the interline correction portion.

FIG. 26 is a block diagram showing a general configuration of the interline correction portion 15.

The interline correction portion 15 includes line delay circuits 231–233, FIFO's (line memories) 234 and 236 and interpolation circuits 235 and 237. As explained above, the line delay circuits 231–233 delay the red image data and the green image data integral lines from the blue image data. The FIFO's 234 and 236 and the interpolation circuits 235 and 237 perform the interpolation process for delaying the fraction line. The interpolation process is applied to the red and blue image data with reference to the green image data that is the most visible by human eyes.

The red, green and blue image data whose phase shifts are corrected by the interline correction portion 15 are further processed by the chromatic aberration correction portion 16 for the correction of chromatic aberration, and the scaling and moving process portion 17 including a line memory for scaling performs the scaling process in the primary scanning direction in accordance with the scaling ratio. Then the processed image data are given to the area determining portion 22D.

The area determining portion 22D includes a fine line decision portion 241, a density correction portion 242 and a chroma decision portion 243 as explained below in detail with reference to FIG. 27. The area determining portion 22D determines whether the present pixel is on a fine line or not. If the present pixel is on a fine line, the densities of the red and blue image data are increased for correction, and the image data are output to the color conversion portion 18.

The area determining portion 22D includes an edge decision portion and a dot decision portion (not shown). The edge decision portion outputs the decision signal EDGE indicating that the present pixel is on the edge portion of the image. The dot decision portion outputs the decision signal AMI indicating that the present pixel is on a dot image. If the chroma decision portion 243 determines a black color region and the edge decision portion determines an edge portion, it is decided that the present pixel is on a black edge and a decision signal BKEDG is output to the MTF correction portion 20.

The MTF correction portion 20 performs an image processing such as edge emphasizing for the region decided to be a black edge in accordance with the decision signal BKEDG from the area determining portion 22D. The area determining portion 22D can determine the dot region too, and the MTF correction portion 20 can perform an image processing such as smoothing in accordance with the determination signal. The color image data C, M, Y and Bk for printing output from the MTF correction portion 20 is given to the printer 21.

Figure 27:
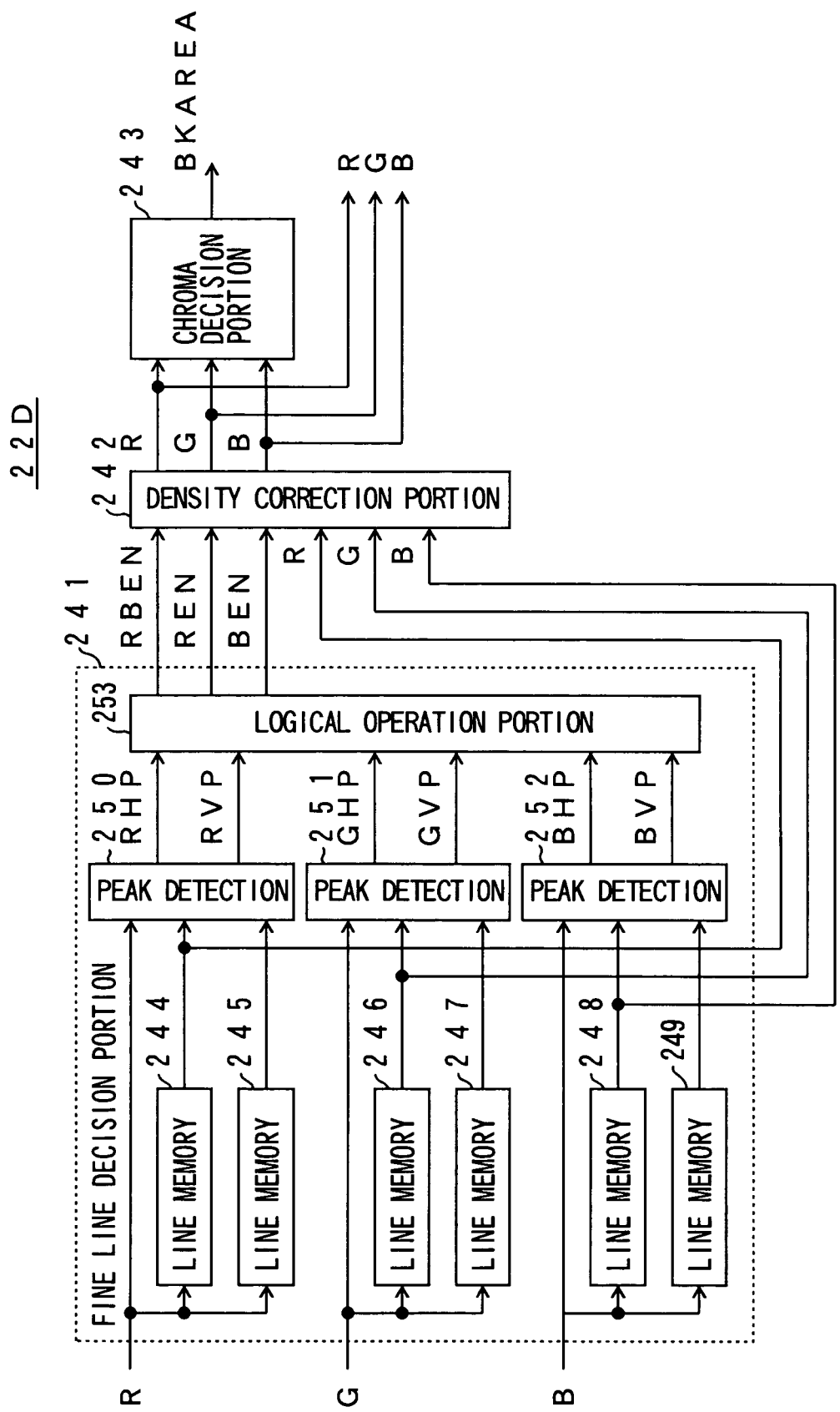
FIG. 27 is a block diagram showing a part of an internal configuration of the area determining portion.

FIG. 27 is a block diagram showing a part of configuration of the area determining portion 22D.

In FIG. 27, the area determining portion 22D includes a fine line decision portion 241 for deciding a black fine line or a fine line of other color, a density correction portion 242 that increases density of at least one of the red and green image data in accordance with the decision signals RBEN, REN and BEN, and a chroma decision portion 243 that decides whether the present pixel is a chromatic color or an achromatic color in accordance with the red, green and blue image data after density correction.

The fine line decision portion 241 includes line memories 244, 246 and 248 for delaying the red, green and blue image data one line and line memories 245, 247 and 2492 for delaying two lines. The fine line decision portion 241 also includes a peak detection portions 250, 251 and 252 for detecting a peak in accordance with the zero delay data, the one-line delayed data and two-line delayed data for red, green and blue image data.

For example, the peak detection portion 250 of the red image data detects the peak in the horizontal direction from variation of the three-line image data, i.e., the present pixel and the straddling image data. If there is a peak, the output signal RHP is set to the low level. If there is no peak, the output signal RHP is set to the high level. In the one-line delayed image data including the present pixel, a peak in the vertical direction is detected in accordance with the variation of the image data of the present pixel and the straddling (upper and lower) image data. If there is a peak, the output signal RVP is set to the low level. If there is no peak, the output signal RVP is set to the high level.

The peak detection portion 251 of the green image data and the peak detection portion 252 of the blue image data also set the output signal GHP or BHP to the low level if there is a peak in the horizontal direction, and set the output signal GHP or BHP to the high level if there is no peak. If there is a peak in the vertical direction, the output signal GVP or BVP is set to the low level. If there is no peak in the vertical direction, the output signal GVP or BVP is set to the high level.

The above-mentioned detection of peak corresponds to a detection of a one-dot width fine line. By detecting a peak after enlarging the variation straddling the present pixel to five lines (five dots), a two-dot width fine line can be detected.

The total six outputs RHP, RVP, GHP, GVP, BHP and BVP obtained by three peak detection portions 250, 251 and 252 detecting a peak in the horizontal direction and in the vertical direction are given to a logical operation portion 53. The logical operation portion 53 performs the following logical operation for the six data to generate three outputs RBEN, REN and BEN.

First, the output RBEN becomes the low level when all of the red, green and blue image data (all wavelength components) have a peak in the horizontal direction or in the vertical direction, and otherwise it becomes the high level as expressed by the following logical expression.

$$RBEN=[(RHP+GHP+BHP)\cdot(RVP+GVP+BVP)]$$

The low level of the signal RBEN means that the possibility of the present pixel being on the black fine line is high.

The output REN becomes the low level when the red image data have a peak in the horizontal direction or in the vertical direction and the output RBEN is not the low level. Otherwise, the output REN becomes the high level. In other words, the output REN is the low level when at least the red component has a peak, and otherwise it is the high level as expressed by the following logical expression. The low level of the signal REN means that the possibility of the present pixel being not on the black fine line but on a fine line of a color including red is high.

$$REN=(RHP\cdot RVP+RBEN)$$

The output BEN is the low level when the blue image data have a peak in the horizontal direction or in the vertical direction and the output RBEN is not the low level, i.e., when at least the red component has a peak. Otherwise, the output BEN is the high level, as expressed by the following logical expression. The low level of the signal BEN means that the possibility of the present pixel being not on the black fine line but on a fine line of a color including blue is high.

$$BEN=(BHP\cdot BVP+RBEN)$$

Figure 33:
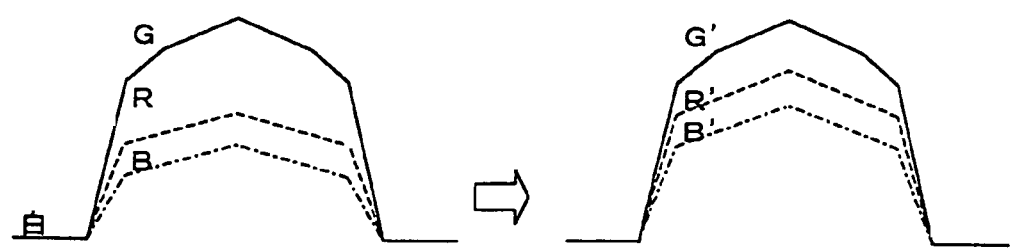
FIG. 33 is a diagram showing correction of density by the density correction portion.

The three obtained decision signal RBEN, REN and BEN are given to the density correction portion 242. The density correction portion 242 is supplied with the red, green and blue pixel data of the present pixel, too. The density correction portion 242 performs the correction increasing the density of at least one of the red and blue pixel data in accordance with the three decision signals RBEN, REN and BEN. FIG. 33 shows the correction of densities by the density correction portion 242.

In FIG. 33, the left side shows the densities before the correction and the right side shows the densities after the correction. In this example, the density of the green pixel is not changed by the correction, but the densities of the red and blue pixel data are increased by the correction. Before correction, the densities of the red and blue pixel data are substantially different from the density of the green pixel data, so this pixel can be decided incorrectly to be on a color letter. However, after the correction, the densities of the red and blue pixel data become close to the density of the green pixel data, so the pixel can be recognized to be on a black fine line or on a black letter. Next, an example of the configuration of the density correction portion 242 will be explained.

Figure 28:
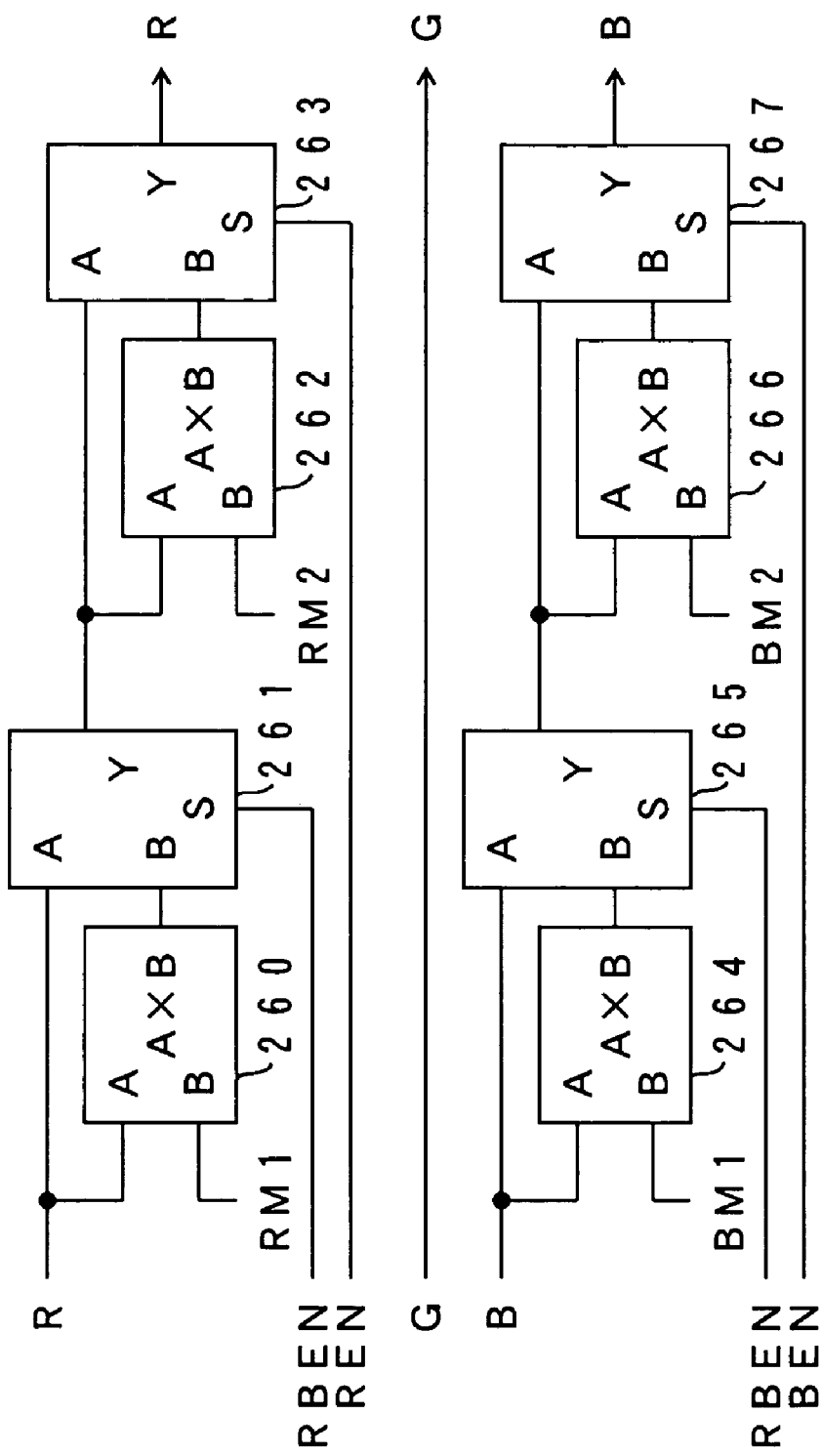
FIG. 28 is a circuit diagram showing an internal configuration of the density correction portion.

FIG. 28 is a circuit diagram showing an example of the configuration of the density correction portion 242.

In FIG. 28, the density correction portion 242 includes multipliers 260, 262 and selectors 261, 263 for increasing the density of the red image data. The density correction portion 242 also includes multipliers 264, 266 and selector 265, 267 for increasing the density of the blue image data.

Since the green image data are used as the reference data, they are output without the density correction. In an exemplary embodiment, the density correction portion can perform correction by increasing a density of image data of wavelength components except for a wavelength component having the best modulation transfer function (MTF) characteristics.

The following explanation is about the density correction of the red image data, and the density correction of the blue image data is performed in the same way. First, the first multiplier 260 multiplies the red image data that is the A input by the B input RM1. The B input RM1 is the first density correction coefficient that is set to a value greater than one. The first selector 261 selects the red color signal of the A input or the output of the multiplier 260 that is the B input in accordance with the value of the S input RBEN. If the S input RBEN is the low level, the output of the multiplier 260, i.e., the red color signal after the density correction is selected. If the S input RBEN is the high level, the red color signal before the density correction is selected.

The second multiplier 262 multiplies the output of the selector 261 that is the A input by the B input RM2. The B input RM2 is the second density correction coefficient that is set to a value greater than one and less than RM1. The second selector 263 selects the output of the selector 261 that is the A input or the output of the multiplier 262 that is the B input in accordance with the value of the S input REN. If the S input REN is the low level (the RBEN is always the high level as mentioned above), the output of the multiplier 262, i.e., the red color signal after the density correction by the second multiplier 262 is selected. If the REN is the high level, the output of the selector 261, i.e., the red color signal before the density correction or the red color signal after the density correction by the first multiplier 260 is selected.

The first multiplier 260 performs the correction increasing the density of the red color signal when the RBEN is the low level, i.e., when a black fine line is detected.

The second multiplier 262 performs the correction increasing the density of the red color signal when the REN is the low level, i.e., when a fine line of color including red is detected. In copying of an original image, reproducibility of a black letter is usually more important than reproducibility of colors. In addition, when a peak is detected only in one or two wavelength components, it can be misdetection due to a noise in higher possibility than when a peak is detected in all wavelength components.

Therefore, as explained above, the correction coefficient RM2 of the second multiplier 262 (i.e., the density correction quantity when a black fine line is detected) is set to a smaller value than the correction coefficient RM1 of the first multiplier 260 (i.e., the density correction quantity when a fine line of color including red is detected).

The operation of the multipliers 264, 266 and selectors 265, 267 for performing the density correction of the blue image data is the same as that of the multipliers 260, 262 and the selectors 261, 263 for performing the density correction of the red image data mentioned above. In this case, too, the correction coefficient BM2 of the second multiplier 266 is set to a smaller value than the correction coefficient BM1 of the first multiplier 264 because of the above-mentioned reason.

The red, green and blue image data after the density correction output from the density correction portion 242 are given to the chroma decision portion 243 as shown in FIG. 27. The chroma decision portion 243, as explained above, calculates the difference between the maximum value and the minimum value of the red, green and blue image data as a chroma value. If the chroma value is less than a threshold that is predetermined in accordance with the lightness (the minimum value of the red, green and blue image data), an achromatic color (a black region) is determined, and the decision signal BKAREA is output. The low level of the decision signal BKAREA means that the black region is determined.

As explained above, an AND of the decision signal BKAREA and the decision signal of the edge decision portion is calculated, and the AND result is output as a black edge portion decision signal BKEDG as shown in FIG. 25 from the area determining portion 22D to the MTF correction portion 20. The red, green and blue image data output from the density correction portion 242 of the area determining portion 22D are given to the chroma decision portion 243 and are output as the red, green and blue image data after the density correction (green image data are not processed by the density correction) from the area determining portion 22D.

As shown in FIG. 25, these red, green and blue image data after the density correction are converted into image data C, M, Y, Bk for printing via the color conversion portion 18 and the color correction portion 19 (the print image data generation portion).

According to the above-mentioned embodiment, it is decided whether the present pixel is on a fine line or not, and if the present pixel is on the fine line, the density of the image data of the corresponding wavelength component (e.g., red or blue color) is increased for correction. Therefore, even if the density balance among red, green and blue colors is lost due to an aberration of the optical system or the interline correction, it can be recovered and the chroma decision portion can determine the black region correctly. As a result, the process of black fine line such as edge emphasizing is performed properly and the reproducibility of black fine lines or black letters is improved.

In addition, the print image data generation portion generates the image data for printing on the basis of the image data after the density correction, so the reproducibility of black color in black fine lines or black letter regions is further improved.

Furthermore, when a fine line of a color except black (red or blue) is detected, the correction quantity for increasing the density of the color is set to the value less than the correction quantity for increasing the density of red and blue colors when a black fine line is detected. Thus, the reproducibility of the black is given a high priority, and an influence of noises can be reduced.

What is claimed is:

1. An image processing apparatus, comprising:
   a first sensor having a plurality of reading elements arranged in a primary scanning direction;
   a second sensor having a plurality of reading elements arranged in the primary scanning direction, the second sensor being disposed a predetermined number of lines apart from the first sensor in a secondary scanning direction;
   an integral correction portion for correcting a data output time difference due to a position difference between the first and the second sensors by an amount corresponding to an integral number of line units;
   a fractional correction portion for correcting the data output time difference due to the position difference between the first and the second sensors by an amount corresponding to less than one line unit; and
   a black fine line detection portion for detecting a black fine line included in image data,
   wherein the fractional correction portion is disabled if the black fine line has been detected by the black fine line detection portion.

2. The image processing apparatus according to claim 1, further comprising:
   a control portion for enabling the fractional correction portion when a fraction is generated adding to integral lines of output time difference between the data from the first sensor and the data from the second sensor after changing a scaling ratio of an original image, wherein the change in the scaling ratio causes a change in the relative speed of the original image to the first and the second sensors.

3. The image processing apparatus according to claim 2, further comprising a third sensor having a plurality of reading elements arranged in the primary scanning direction, the third sensor being disposed a predetermined number of lines apart from the first sensor in the secondary scanning direction.

4. The image processing apparatus according to claim 3, wherein the first, the second and the third sensors read red, green and blue components of an original image, respectively.

5. The image processing apparatus according to claim 4, wherein the first, the second and the third sensors make up a contraction type color CCD sensor.

6. The image processing apparatus according to claim 1, wherein the black fine line detection portion detects a black fine line having a width of one dot.

7. An image processing apparatus, comprising:
a sensor disposed linearly in a primary scanning direction, the sensor reading an image that has been decomposed into plural colors;
an optical system for projecting light from the image onto the sensor; and
a correction portion for correcting a phase shift among the colors in the primary scanning direction due to a chromatic aberration of the optical system, the correction portion performing a phase shift correction for each of plural areas divided in the primary scanning direction;
wherein a predetermined test image is read according to a characteristic of a machine coupled to the image processing apparatus and wherein information for the correction for each area is obtained from the image data; and
wherein the test image is a ladder chart in which black lines are arranged by a predetermined pitch in the primary scanning direction, a position shift among barycenters of the obtained red, green and blue image data is calculated, and boundaries of the areas and correction coefficients for the areas are obtained as information for correction for each area in accordance with a distribution of the position shift among the barycenters of the red, green and blue image data in the primary scanning direction.

8. The image processing applaratus according to claim 7, wherein the sensor includes line sensors for red, green and blue colors arranged by a predetermined pitch in a secondary scanning direction.

9. A color image processing apparatus, comprising;
a fine line decision portion for deciding whether the present pixel is on a fine line or not for plural image data having different wavelength components read by an image reading device;
a density correction portion for performing correction by increasing a density of image data of at least one wavelength component among image data of plural wavelength components that constitute the present pixel when the present pixel is on a fine line on the basis of a signal from the fine line decision portion so as to reduce a difference between densities of image data of the plural wavelength components that constitute the present pixel; and
a chroma decision portion for deciding whether the present pixel has a chromatic color or an achromatic color using an output value of the density correction portion.

10. The color image processing apparatus according to claim 9, wherein the fine line decision portion detects one- or two-dot width fine lines with a high density.

11. The color image processing apparatus according to claim 9, further comprising a print image data generation portion for generating image data for printing using the output value of the density correction portion.

12. The color image processing apparatus according to claim 9, wherein the density correction portion performs correction by increasing a density of image data of wavelength components except for a wavelength component having best modulation transfer function (MTF) characteristics.

13. The color image processing apparatus according to claim 9, wherein:
a sensor included in the image reading device has a plurality of element arrays corresponding to different wavelength components, the plural element arrays being disposed separate from one another in a secondary scanning direction different from a primary scanning direction,
an interline correction portion is provided for correcting a phase shift among image data of the different wavelength components due to the phase shift among the plural element arrays,
the density correction portion performs correction by increasing a density of image data of a first wavelength component, and
the interline correction portion performs correction by processing image data of the first wavelength component by an interpolation process.

14. The color image processing apparatus according to claim 13,
wherein the density correction portion performs correction by increasing a density of image data of a second wavelength component and without increasing a density of image data of a third wavelength component, and
wherein the interline correction portion performs correction by processing the image data of the first and second wavelength components by the interpolation process using the image data of the third wavelength component as a reference.

15. The color image processing apparatus according to claim 9, wherein the density correction portion performs correction by applying a first density correction quantity in a case where the fine line decision portion decides that the present pixel is on a fine line for each of image data of all wavelength components, and by applying a second density correction quantity in a case where the fine line decision portion decides that the present pixel is on a fine line only for a part of the wavelength components, the second density correction quantity being set to a value less than the first density correction quantity.

* * * * *